(12) United States Patent
Smith

(10) Patent No.: US 8,425,968 B2
(45) Date of Patent: Apr. 23, 2013

(54) BEVERAGE PRESERVATIVE SYSTEM CONTAINING PIMARICIN-CYCLODEXTRIN COMPLEX

(75) Inventor: Richard T. Smith, Ridgefield, CT (US)

(73) Assignee: PepsiCo., Inc., Purchase, NY (US)

( * ) Notice: Subject to any disclaimer, the term of this patent is extended or adjusted under 35 U.S.C. 154(b) by 201 days.

(21) Appl. No.: 12/814,585

(22) Filed: Jun. 14, 2010

(65) Prior Publication Data

US 2010/0323065 A1 Dec. 23, 2010

Related U.S. Application Data

(60) Provisional application No. 61/218,484, filed on Jun. 19, 2009.

(51) Int. Cl.
A23L 2/44 (2006.01)

(52) U.S. Cl.
USPC ............ 426/590; 426/61; 426/320; 426/321; 426/599; 426/654

(58) Field of Classification Search .................. 426/590, 426/599, 61, 654, 320, 321
See application file for complete search history.

(56) References Cited

U.S. PATENT DOCUMENTS

| | | | |
|---|---|---|---|
| 5,573,800 A | 11/1996 | Wilhoit | |
| 5,738,888 A | 4/1998 | Cirigliano et al. | |
| 6,136,356 A | 10/2000 | Bunger et al. | |
| 6,228,408 B1 | 5/2001 | Van Rijn et al. | |
| 6,383,471 B1 | 5/2002 | Chen et al. | |
| 6,723,358 B1 | 4/2004 | Van Lengerich | |
| 2005/0042341 A1* | 2/2005 | Thomas et al. | 426/321 |
| 2005/0191393 A1 | 9/2005 | Postma et al. | |
| 2006/0105045 A1 | 5/2006 | Buchanan et al. | |
| 2007/0065547 A1* | 3/2007 | Coyne et al. | 426/326 |
| 2007/0141096 A1 | 6/2007 | Van Lengerich | |

FOREIGN PATENT DOCUMENTS

| | | |
|---|---|---|
| CN | 1257409 | 6/2000 |
| CN | 1788558 | 6/2006 |
| CN | 1921755 | 2/2007 |
| WO | 9300082 | 1/1993 |
| WO | 2007054103 | 5/2007 |
| WO | 2007084445 | 7/2007 |
| WO | 2008049437 | 5/2008 |

OTHER PUBLICATIONS

Koontz, John et al. "Stability of Natamycin and Its Cyclodextrin Inclusion Complexes in Aqueous Solution", J. of Agricultural and Food Chemistry, 2003,51 (24, pp. 7111-7114), http://pub.acs.org/doi/full/10.1021/jf030333q, pp. 1-7.*

(Continued)

Primary Examiner — Helen F Heggestad
(74) Attorney, Agent, or Firm — Banner & Witcoff, Ltd.

(57) ABSTRACT

The present invention provides a beverage preservative system comprising a pimaricin-cyclodextrin complex for use in beverages products. The present invention is further directed to beverage products comprising the beverage preservative systems. The beverage preservative system prevents spoilage by microorganisms in a beverage within a sealed container for a period of at least 16 weeks.

19 Claims, 4 Drawing Sheets

Pimaricin + Cyclodextrin ⇌ Pimaricin in complex with Cyclodextrin

OTHER PUBLICATIONS

PCT/US2010/038750, International Search Report and Written Opinion, dated Nov. 17, 2010.

Koontz et al. "Stability of natamycin and its cyclodextrin inclusion complexes in aqueous solution";Journal of Agricultural and Food Chemistry, 2003, vol. 51, No. 24 Nov. 19, pp. 7111-7114.

Koontz "Formation of natamycin"; Cyclodextrin inclusion complexes and their characterization; Journal of Agricultural and Food Chemistry, 2003, vol. 51, No. 24, pp. 7106-7111.

Chinese Patent Application 201080027043.9, Office Action dated Oct. 10, 2012.

* cited by examiner

TOLERANCE OF MOLD SPECIES TO PIMARICIN (PPM)

| Neg Control | Aspergillus (CA?) | T. spectabilis | P. glabrum | B. fulva | N. fischeri | T. flavus | T. flavus var flavus | [Pimaricin] PPM |
|---|---|---|---|---|---|---|---|---|
| ○ | ● | ○ | ○ | ○ | ● | ● | ● | 20 |
| ○ | ● | ○ | ○ | ○ | ● | ● | ● | 18.4 |
| ○ | ● | ○ | ○ | ○ | ● | ● | ● | 16.9 |
| ○ | ● | ○ | ○ | ○ | ● | ● | ● | 15.6 |
| ○ | ● | ○ | ○ | ○ | ● | ● | ● | 14.3 |
| ○ | ● | ○ | ○ | ○ | ● | ● | ● | 13.2 |
| ○ | ● | ○ | ○ | ○ | ● | ● | ● | 12.1 |
| ○ | ● | ○ | ○ | ○ | ● | ● | ● | 11.2 |
| ○ | ● | ○ | ○ | ○ | ● | ● | ● | 10.3 |
| ○ | ● | ● | ○ | ○ | ● | ● | ● | 9.4 |
| ○ | ● | ● | ○ | ○ | ● | ● | ● | 8.7 |
| ○ | ● | ● | ○ | ● | ● | ● | ● | 8.0 |
| ○ | ● | ● | ○ | ● | ● | ● | ● | 7.35 |
| ○ | ● | ● | ○ | ● | ● | ● | ● | 6.77 |
| ○ | ● | ● | ○ | ● | ● | ● | ● | 6.22 |
| ○ | ● | ● | ○ | ● | ● | ● | ● | 5.73 |
| ○ | ● | ● | ● | ● | ● | ● | ● | 5.27 |
| ○ | ● | ● | ● | ● | ● | ● | ● | 4.85 |
| ○ | ● | ● | ● | ● | ● | ● | ● | 4.46 |
| ○ | ● | ● | ● | ● | ● | ● | ● | 4.10 |
| ○ | ● | ● | ● | ● | ● | ● | ● | 3.77 |
| ○ | ● | ● | ● | ● | ● | ● | ● | 3.47 |
| ○ | ● | ● | ● | ● | ● | ● | ● | 3.19 |
| ○ | ● | ● | ● | ● | ● | ● | ● | 0.00 |

FIG. 4

BEVERAGE PRESERVATIVE SYSTEM CONTAINING PIMARICIN-CYCLODEXTRIN COMPLEX

RELATED APPLICATIONS

This application claims priority to U.S. Ser. No. 61/218,484, filed Jun. 19, 2009, which is hereby incorporated by reference in its entirety.

TECHNICAL FIELD

This invention relates to beverage preservative systems and beverage products comprising the preservative system. In particular, this invention relates to beverage preservative systems having formulations suitable to meet consumer demand for healthy and environmentally friendly ingredients.

BACKGROUND

Many food and beverage products include chemical preservatives to extend the shelf-life of the product by inhibiting the growth of spoilage microorganisms (e.g., mold, yeast, bacteria). However, some preservatives currently in use have been characterized as either a detriment to one's health, a threat to the environment, or as insufficiently stable. Therefore, there is market demand for food and beverage products which do not include these detrimental preservatives, and yet still possess extended shelf-life.

For example, benzoic acid and its salts are commonly used in beverage products as preservatives. However, in some beverage formulations that possess vitamin C and a relatively high pH, a small fraction of benzoic acid and its salts is prone to conversion into benzene (ppb quantities). Heat and certain wavelengths of light increase the rate of this reaction, so extra care need be taken in the production and storage of beverage such products when both benzoate and ascorbic acid are ingredients. Intake of benzene in drinking water is a public health concern, and the World Health Organization (WHO) and several governing bodies within the United States and the European Union have set upper limits for benzene content in drinking water of 10 ppb, 5 ppb, and 1 ppb, respectively.

Ethylenediamine tetraacetic acid (EDTA) and its salts are also common beverage product preservative. EDTA sequesters metal ions and can impact their participation in any number of chemical reactions. At elevated concentrations, EDTA can serve to starve bacteria of needed trace elements. At relatively low concentrations as typically found in beverage, EDTA facilitates the activity of at least weak acid preservatives such as sorbic and benzoic acid. However, EDTA is not bio-degradable, nor is it removed during conventional wastewater treatment. EDTA has surfaced as environmental concerns predominantly because of its persistence and strong metal chelating properties. Widespread use of EDTA and its slow removal under many environmental conditions have led to its status as the most abundant anthropogenic compound in many European surface waters. River concentrations of EDTA in Europe are reported in the range of 10-100 μg/L, and lake concentrations of EDTA are in the range of 1-10 μg/L. EDTA concentrations in U.S. groundwater receiving wastewater effluent discharge have been reported in the range of 1-72 μg/L, and EDTA was found to be an effected tracer for effluent, with higher concentrations of EDTA corresponding to a greater percentage of reclaimed water in drinking water production wells.

Polyphosphates are another type of sequestrant employed as a beverage product preservative. However, polyphosphates are not stabile in aqueous solution and degrade rapidly at ambient temperature. Degradation of polyphosphates results in unsatisfactory sensory issues in the beverage product, such as change in acidity. Also, the shelf-life of the beverage product can be compromised as the concentration of polyphosphate deteriorates.

It is therefore an object of the present invention to provide new preservative systems for use in beverages as replacements for at least one currently used preservative that has detrimental health and/or environmental effects, or lack of sufficient stability. It is further an object of the invention to provide new beverage preservative systems with improved sensory impact. It is further an object of the invention to provide preservative systems without benzoic acid and/or reduced concentrations of sorbic acid. Some countries have regulatory restrictions on the use of sorbic acid in food and beverage products wherein the permitted concentration is less than is required to inhibit the growth of spoilage microorganisms.

SUMMARY

According to an aspect of the invention, a beverage preservative system is provided which comprises: a pimaricin-cyclodextrin complex; wherein the preservative system prevents spoilage by microorganisms in a beverage within a sealed container for a period of at least 16 weeks.

According to another aspect of the invention, a beverage product is provided which comprises: a beverage component; a pimaricin-cyclodextrin complex wherein the beverage has a pH of 2.5 to 7.5; and the beverage when placed within a sealed container is substantially not spoiled by microorganisms for a period of at least 16 weeks. In accordance with a further aspect, the beverage is a high acid beverage having a pH of about 2.5 to about 5.6 or about 2.5 to about 4.6.

According to an aspect of the invention, a beverage preservative system is provided which comprises: a pimaricin-cyclodextrin complex and povidone; wherein the preservative system prevents spoilage by microorganisms in a beverage within a sealed container for a period of at least 16 weeks.

According to another aspect of the invention, a beverage product is provided which comprises: a beverage component; a pimaricin-cyclodextrin complex and povidone wherein the beverage has a pH of 2.5 to 7.5; and the beverage when placed within a sealed container is substantially not spoiled by microorganisms for a period of at least 16 weeks. In accordance with a further aspect, the beverage is a high acid beverage having a pH of about 2.5 to about 5.6 or about 2.5 to about 4.6.

According to one aspect of the invention, a beverage preservative system is provided which comprises: a pimaricin-cyclodextrin complex and DMDC wherein the beverage preservative system prevents growth of spoilage microorganisms in a beverage contained by a package and seal (closure) for a period of at least 16 weeks. Another aspect of the invention is directed to a beverage containing the beverage preservative system comprising a pimaricin-cyclodextrin complex and DMDC.

These and other aspects, features, and advantages of the invention or of certain embodiments of the invention will be apparent to those skilled in the art from the following disclosure and description of exemplary embodiments.

BRIEF DESCRIPTION OF THE DRAWINGS

FIG. 4 shows a typical test grid for the establishing the tolerance toward Pimarcin in the presence or absence of complex with cyclodextrin among an array of different bio-indicator mold fungi.

DETAILED DESCRIPTION

Figure 1:
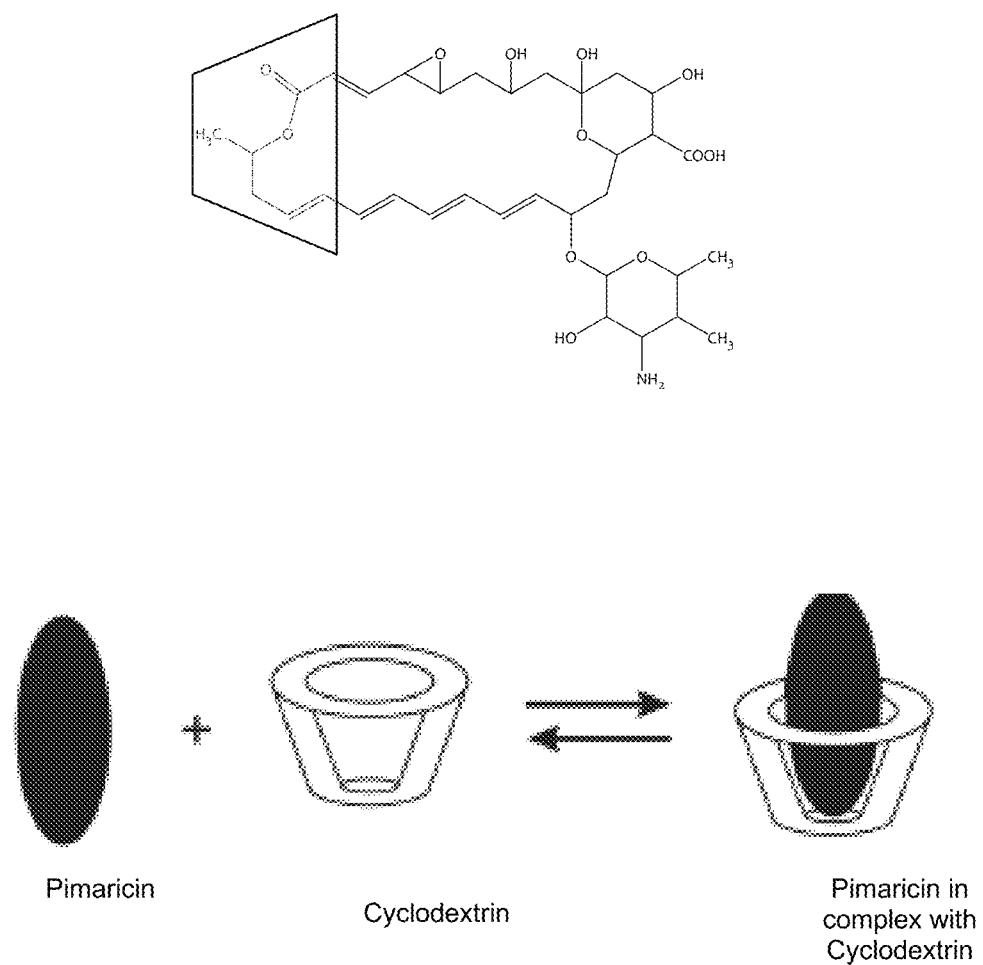
FIG. 1 shows a schematic of guest-host relationship between pimaricin and cyclodextrin.

The present invention is directed to a preservative system particularly suited for beverages having a pH no greater than pH 7.5 wherein the beverage is preserved for a period of at least 16 weeks. The preservative system comprises a pimaricin-cyclodextrin complex.

The present invention is particularly effective in preventing spoilage of beverages that can be initiated by either vegetative mold hyphae or spores of molds that are capable of germinating to a vegetative form when suspended in a beverage. Fungi forms that are inhibited by the preservative system include yeast, mold and dimorphic forms of fungi such as occurs in *Yarrowia, Candida* and, possibly, *Brettanomyces*. Mold spores may not be inactivated by the presence of the preservative system invention, but the spores are either prohibited from germinating in the presence of the invention or the vegetative form of the mold that results upon germination is prohibited from growth beyond a small number of cell cycle replications.

Pimaricin is a natural bio-active compound that serves to prohibit the growth of yeast and mold fungi. Historically, the limits of solubility and stability of pimaricin in aqueous systems prohibited the use of this antimicrobial in the role of beverage preservative. In and of itself, Pimaricin is able to enter an aqueous solution at 52 mg/L. This is nearly 4 fold less than the amount of pimaricin that must be added to many types of a beverage in order to prohibit the outgrowth of mold fungi for a period of 16 weeks, the limit of product shelf life. Moreover, the presence of other ingredients, such as acid or sugar, further impedes the ability of pimaricin to enter solution. Only the amount of pimaricin that is in solution can act as a preservative. The notable formation of a precipitate of pimaricin in a system (beverage) is a clear indication that the ability of pimaricin to inhibit growth of mold has been compromised. Thus products containing pimaricin in the form of a precipitate are not stable for the whole period of the shelf life requirement.

The present invention is based on the discovery that pimaricin may be combined with a substance that serves to increase the solubility of pimaricin, without measurably impairing the activity of pimaricin. The limit of solubility of pimaricin in solution (25° C.) is approximately 52 mg per liter solution, but an association between pimaricin and cyclodextrin permits pimaricin to remain in solution to at least 500 mg per liter, even at temperatures found in refrigerated display cases (8-10° C.). Further, pimaricin is maintained in solution in a form that does not precipitate. Thus, the quality attributes of the product are maintained. The stabilization of product for a period of 16 weeks without compromise to quality attributes of product measurably differentiates the application of this invention from other methods of deploying pimaricin as a beverage preservative. The minimum initial stand alone concentration of pimaricin needed to preserve product for a period of 16 weeks is 400 mg pimaricin per liter.

Sodium (Na+) and Chloride (Cl—) when present in specific ratios are known to interact in a manner which results in the formation of salt (sodium chloride), a substance that possesses chemical and physical characteristics different than either of its components. Similarly, pimaricin and cyclodextrin, when present in appropriate ratio and concentration, will spontaneously interact in a manner that yields a clathrate, a complex, or a structure that shares characteristics of both a clathrate and a complex. The clathrate-complex possesses chemical and physical attributes that are distinct from its two components. As such, the chemical structure of pimaricin-cyclodextrin is distinct from a pimaricin alone. Also, the interaction between cyclodextrin and pimaricin is different than occurs between a surfactant (solubilizer) where in the interaction between "guest" and "host" results in a micelle encapsulate. Here, hydrophobic interactions dictate that the guest will be largely buried in the hydrophobic center of the micelle. When complexed with cyclodextrin, pimaricin is still accessible to the bulk solution and to the surface of the microorganism.

Summarizing, pimaricin is therefore a natural bio-active component that serves to prohibit the growth of yeast and mold fungi and the cyclodextrin serves to maintain a relatively uniform distribution of the pimaricin throughout the total volume occupied by the beverage. The term "relatively uniform distribution" means homogenous as established by the classical or traditional analytical chemistry methods. The bio-active component can be thought of as a "guest" and the agent that serves to maintain uniform distribution of the guest is the "host". A guest may interact with a host in one of two ways. When an association evolves because of a charge transfer or the formation of a co-ordinate covalent bond, the association is referred to as a complex. In the instance where the guest simply fits neatly into a cavity provided by the host, the association is a clathrate. The majority of guest host associations are a combination of both phenomena. The association between Pimaricin and a cyclodextrin molecule is likely driven by both classes of interaction. FIG. 1 shows a schematic of the likely arrangement for the guest-host relationship between pimaricin and cyclodextrin.

The complex is distinct from encapsulations. Allowing "CD" to represent a cyclodextrin molecule and the letter "P" to represent pimaricin, the nature of the complex between cyclodextrin and pimaricin can be represented in shorthand as $CD_n:P_n$ wherein subscript n=the number of either CD or P that are party to the complex. When one molecule of CD forms a complex with one molecule of P, the complex is 1:1 with respect to CD& P and the complex can be abbreviated $CD_1P_1$. Generally speaking, the form $CD_1:P_1$ will predominate, but slight variation in the ratio will likely occur. Examples of other complex forms include $CD_1:P_2$ $CD_1:P_3$, or $CD_2:P_1$, $CD_3:P_1$ or $CD_2P_2$ and $CD_3P_3$ Because of the molecular dimensions of pimaricin relative to the cyclodextrin, the majority of the pimaricin structure will protrude out away from the complex. (See FIG. 1 for a representation of complex) The complex can be thought of in terms of a racket (pimaricin) in the grip of a hand (cyclodextrin). Consequently, the complex that is likely to predominate is CD1P1

Another common name for pimaricin is natamycin. The IUPAC systematic name for natamycin is (IR,3S,5R,7R,8E, 12R,14E,16E,18E,20E,22R,24S,25R,26S)-{[3S,4S,5S,6R)-4-amino-3,5-dihydroxy-6-methyloxan-2-yl]oxy}-1,3,26 trihydroxy-12-methyl-10-oxo-6,11,28-trioxatricyclo [22.3.1.0$^{5,7}$]octacosa-8,14,16,18,20 pentaene-25-carboxylic acid. A second rendition of the IUPAC name for the pimaricin ($C_{33}H_{47}NO_{13}$) is 22-[(3 amino-3,6-dideoxy-B-D-mannopyranosyl)-oxy]-1,3,26-trihydroxy-12-methyl-10-oxo-6,11, 28-trioxatricyclo[22.3.1.0$^{5,7}$]octacosa-8,14,16,18,20 pentaene-25-carboxylic acid. Pimaricin has been assigned the CAS number 7681-93-8. It is approved for use in at least some foods (for instance, European food additive number is E235 (preservative) and E1201 (stabilizer) and the recommended ADI is 0-0.3 mg/kg of body weight.

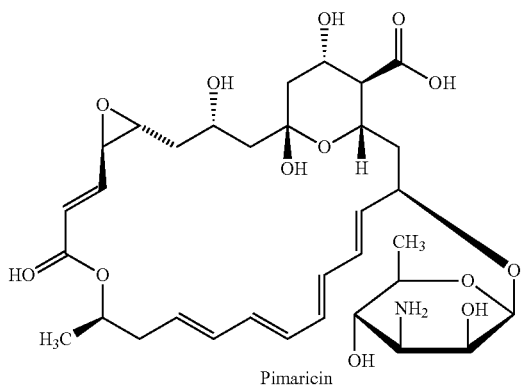

Pimaricin

Pimaricin is an effective antifungal agent (yeast and mold) and it has limited approval for use in foods. The compound functions through an interaction with fungal steroid known as ergosterol, a substance present only in fungi. Consequently, pimaricin has not proven toxic in whole animal or tissue culture studies. Additionally, the degradation products of pimaricin are shown to be non-toxic. The degradation products of pimaricin do not differ significantly from the degradation products of cholesterol. Degradation, if it occurs at all, is not driven measurably by temperatures below 37° C.

Pimaricin is a white, tasteless, and odorless compound. The antimicrobial activity is stable to at least short exposures of 120° F. and does not decompose at a measurable rate unless temperatures exceed 356° F. Unfortunately, as noted above, pimaricin is not particularly soluble in aqueous solutions. It demonstrates solubility in pure water (25° C.) of only 0.052 mg/ml (52 mg/L) where pH is estimated to be approximately 6.4. (Pimaricin, possesses a single carboxylic group that drives the acidic pH value).

Pimaricin is present in a beverage an amount of at least about 25 mg/L and to about 400 mg/L, at least about 25 mg/L and to about 250 mg/L, at least about 50 mg/L and to about 200 mg/L, or at least about 75 mg/L and to about 150 mg/L.

The presence of other solute components (sugars, vitamins, etc) and a pH other than 6.4 will impact solubility, generally in an unfavorable manner. Pimaricin, in and of itself, is not sufficiently soluble in beverage to function as a beverage preservative. For instance, test results indicate a solubility limit of only 20 mg/L Pimaricin at 25° C. pH 3.4 and 10 mg/L at 4° C. and pH 3.4 in a 12 Brix apple juice beverage. Pimaricin is not sufficiently soluble in beverage to function as a beverage preservative in and of itself. Furthermore, at the natural limit of solubility for Pimaricin, it cannot function additively with other preservative substances given the physical, sensory or regulatory limits on use of these adjunct antimicrobial agents. For instance, cinnamic acid is a particularly good adjunct preservative if it can be employed at concentrations at or below 30 mg/L where the impact on taste can be mitigated. 30 mg/L cinnamic acid in combination with 10 mg/L Pimaricin is not an effective preservative combination. However, 30 mg/L cinnamic acid combined with even 200 mg/L Pimaricin is measurably effective.

Further, it may be necessary to employ a relatively high initial concentration of pimaricin in order to compensate for degradation that occurs when pimaricin is exposed to UV light. Otherwise stated, it may be necessary to introduce pimaricin at an initial concentration that slightly exceeds the minimum concentration required to inhibit growth (in the absence of UV light) in order to ensure a sufficient quantity of pimaricin throughout the life of the product. Recall that the degradative compoments of pimaricin are not toxic and are also not inclined to change the sensory attributes of the product. This issue can also be addressed by deployment of UV blockers or UV absorbing substances in the beverage.

The solubility of any compound, pimaricin included, is not an absolute solubility and solubility will vary measurably as a function of pH, temperature, molar concentration of ions, and concentration of other solutes (such as sweetener). In the specific case of solubility in water at 25° C. (standard measure for solubility), the accepted value of solubility for pimaricin is 0.052 mg/ml (52 μg/ml). Such a solution would be expected to exhibit a pH 5-7.5 based on observation that a 1% suspension of pimaricin in de-mineralized water possesses such a pH.

The other component of the complex is cyclodextrin. Some cyclodextrins are natural substances. Cyclodextrins are commonly employed in the pharmaceutical and cosmetic industry for complex drugs. The cyclodextrin may enhance dissolution, enhance solubility, or enhance efficacy to protect substance from harmful chemical reactions or to provide mitigate the sensory impact of the chemical in complex with the cyclodextrin preservatives. For example, the unfavorable taste of nicotine is mitigated by complex with cyclodextrins allowing the use of the substance in pharmacological compositions employed to reduce craving for cigarettes. Additionally, cyclodextrins can reduce the apparent or observed vapor pressure of volatile substances to which it complexes.

TABLE A

| Cyclodextrin (CD) | Abbrevation |
|---|---|
| α-cyclodextrin | α-CD |
| β-cyclodextrin | β-CD |
| γ-cyclodextrin | γ-CD |
| Hydroxyethyl-β-CD | HE-β-CD |
| Hydroxypropyl-β-CD | HP-β-CD |
| Sulfobutylether-β-CD | SBE-β-CD |
| Methyl-β-CD | M-β-CD |
| Dimethyl-β-CD | DM-β-CD (DIMEB) |
| Randomly dimethylated-β-CD | RDM-β-CD |
| Randomly methylated-β-CD | RM-β-CD (RAMEB) |
| Carboxymethyl-β-CD | CM-β-CD |
| Carboxymethyl ethyl-β-CD | CME-β-CD |
| Diethyl-β-CD | DE-β-CD |
| Tri-O-methyl-β-CD | TRIMEB |
| Tri-O-ethyl-β-CD | TE-β-CD |
| Tri-O-butyryl-β-CD | TB-β-CD |
| Tri-O-valeryl-β-CD | TV-β-CD |
| Di-O-hexanoyl-β-CD | DH-β-CD |
| Glucosyl-β-CD | $G_1$-β-CD |
| Maltosyl-β-CD | $G_2$-β-CD |
| 2-hydroxy-3-trimethyl-ammoniopropyl-β-CD | HTMAPCD |

It was not expected that pimaricin would complex with cyclodextrin in a manner that would be appropriate for use as a beverage preservative. First, and as stated previously, pimaricin is a large molecule relative to the cavity of the cyclodextrin. Secondly, pimaricin needs to complex with a cyclodextrin in a quantity that is sufficient to serve as a preservative. Thirdly, pimaricin would need to remain stable for a period of time necessary to function as a preservative and not negatively impact the taste or other sensory attributes of the product. There are numerous reports in the literature citing the general chemical instability of pimaricin in solution.

Fourthly, Pimaricin cannot be measurably displaced from cyclodextrin by other beverage ingredients. Displacement in measurable amounts will result in precipitation of pimaricin and this would not be acceptable from the perspective of presentation to the consumer. Finally, the pimaricin molecule must "release" from the complex in the presence of a spoilage microorganism and then bind irreversibly to the microorganism in preference to returning to the state of complex with cyclodextrin.

Cyclodextrins are cyclic oligosaccharides (sugar) possessing a hollow cone like structure, much like that found with a donut. Cyclodextrin is a water soluble carbohydrate possessing a central core region that is largely hydrophobic. Chemicals possessing certain physical properties with regard to size, hydrophobicity, polarity and surface area can be caused to interact with functional groups contained within the hollow of the cyclodextrin such that the guest molecule becomes encompassed by the ring or donut of the cyclodextrin. Often, this interaction serves to mask one or more physical or chemical characteristics of the guest molecule. To the degree that the masked characteristics are unfavorable with regard to a particular function, the complex offers an advantage over the un-complexed molecule. Herein the cyclodextrin is referred to as the ligand or host and the molecule which interacts with the cyclodextrin is the guest or solute. The ratio of host to guest is typically 1:1 or 2:1 but other ratios are feasible.

Although the chemistry of cyclodextrins is well established, there is only a limited degree of understanding among experts in the field about how to predict whether a molecule might interact with a cyclodextrin molecule to form a complex and the extent of the interaction. Much less understanding exists regarding the extent to which a complex might overcome a particular shortcoming of the guest molecule with regard to desired end result. Even less is understood about how a complex (host and guest) interact with other components contained within a system. By virtue of these facts, the host-guest relationships defined here for use as preservatives are unique and non-obvious.

Cyclodextrin and pimaricin are brought together in such a fashion as to result in the formation of a complex. Although pimaricin is a rather large molecule and will not fit completely within the core of the cyclodextrin; specific side chains of pimaricin do interact with cyclodextrin in a manner that enhances the aqueous solubility of pimaricin.

Generally, the complex will exist such that the ratio of pimaricin to cyclodextrin is 1:1. However, it is possible that other ratios will exist including 1:2, 1:3, 1:4, 2:1, 2:3, and 3:1. Representative types of cyclodextrins are identified in the following Table II. The binding of pimaricin to these alpha; beta, and gamma cyclodextrin is believed to be predictive of the binding of pimaricin to any type of cyclodextrin because all cyclodextrins are derived from these 3 forms. If a substance binds to beta cyclodextrin, it should not bind less tightly to modified forms of beta cyclodextrin.

TABLE B

Forms of Cyclodextrin that are representative of all cyclodextrin forms

| Cyclodextrin Name | Abbreviation |
| --- | --- |
| beta-cyclodextrin | β CD |
| gamma-cyclodextrin | γ CD |
| sulfobutyl ether β-cyclodextrin | (SBE β CD) |
| hydroxypropyl β-cyclodextrin | HP β CD |
| randomly methylated β-cyclodextrin | RM β CD |
| maltosyl/dimaltosyl β-cyclodextrin | M/DM/β CD |

When engaged into a complex, pimaricin will possibly exhibits different characteristics from same un-complexed form. Characteristics that may be exhibited by pimaricin when in complex with compounds from Tables A or B include 1) enhanced antimicrobial activity relative to the free form, 2) enhanced solubility in aqueous suspensions when in the state of complex with cyclodextrin, 3) an observed antifungal activity that is sufficient to prevent the outgrowth and spoilage of beverage products possessing a pH of less than 6 for a period of time equal to 16 weeks or greater, and 4) enhanced stability of pimaricin in beverage.

An aspect of the invention is directed to a beverage preservative system comprising pimaricin at a concentration of at least 100 mg/L which is obtainable because of the complex formed with cyclodextrin. More typically, beverage formulations will be made to contain an initial concentration of pimaricin of 350-400 mg/L. This targeted initial concentration will compensate for degradation that can occur in the absence of UV blockers or UV absorbing beverage components. For instance, fortified water beverages will not likely contain UV absorbing substances that can protect cyclodextrin.

The pH of the beverage may be any pH in the range 2.5-7.5. The activity of pimaricin is measurably independent of pH in the range of 2.5-6. Above pH 6.0, the activity is only slightly diminished but this can be compensated by addition of slightly higher concentrations of pimaricin. Typical pH ranges are 2.5 to 6, 2.5 to 5.6, and 2.5 to 4.6

In addition to the pimaricin and the cyclodextrin, another component may be povidone (polyvinylpyrrolidone) (CAS 9003-39-8) Other formal names include 1-ethenyl-2-pyrrolidon homopolymer, poly[1-(2-oxo-1-pyrrolidnyl)ethylene], Crospovidone and 1-vinyl-2-pyrrolidinon-polymere). Abbreviations and other commonly employed names include PNVP, povidone, and polyvidone). Povidone is a polymer of vinylpyrrolidone. As such, it can be made to various lengths through addition of successive monomer units. Typically, a preparation of povidone will possess a mixture of polymers of slightly different lengths wherein an average length and a range of length can be established through analytical methods. It is common to find commercial preparations that are characterized by different average length or different range of lengths or both.

Povidone

Povidone is referred to as a suspending material or agent. Povidone also appears to possess characteristics of substances known as hydrotropes. As such, Povidone can be employed as a vehicle for extending the limit of solubility of a number of compounds and drugs. The phrase "extending the limit of solubility" is meant to mean that the upper limit of solubility has been increased for a substance that is entered into a solution which is predominately composed of water (aqueous system). A liter of pure water possesses a concentration of water equal to 55.5 moles per liter or 1000 g/L. Water remains the principle component in a beverage even after substituting beverage ingredients for some amount of water.

However, it is difficult to predict whether povidone can be employed to extend the solubility of a bio-active substance without compromise to the bio-activity. Although solubility extenders may improve solubility of an active compound, they may impair the activity of the active compound rendering such compound ineffective. Further, the components of a beverage may displace pimaricin from the complex with povidone resulting in a precipitate.

Although not wishing to be bound by any theory, the povidone may retard formation of pimaricin-pimaricin interactions thus promoting pimaricin-cyclodextrin interactions. Further, povidone may serve to prohibit interactions between two or more complexed cyclodextrin:pimaricin. An effective amount of povidone is added to aid solubility of the pimaricin, retard formation of pimaricin-pimaricin interactions and/ or promote pimaricin-cyclodextrin interactions. Generally, the amount of povidone added is 0.5 wt % to 10 wt % based on total beverage weight.

Dimethyl dicarbonate may be included in the present preservative formulation.

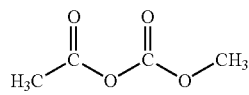

Dimethyl dicarbonate (DMDC) is effective only toward bacterial and fungal organisms that are in the vegetative state. DMDC is not active against the spore state of organisms. Many types of spoilage organisms are able to convert between vegetative and spore states. Spores are dormant structures consisting of a hardened coat that encompass the specific remnants of the vegetative-state which required for the organism to re-instate growth (germination). The spore state offers protection from chemical and physical agents that are lethal to vegetative forms.

DMDC is subject to rapid decomposition in aqueous systems, and the rate of degradation is so fast that there is no chance for the action of residual DMDC on mold spores as such spores generally begin to germinate 1 to 2 hours after becoming exposed to the beverage (spores that are contaminants by virtue of the association with food contact surfaces of the packaging materials). Thus, DMDC cannot be employed as a stand alone preservative because it is inactive against mold spores and it dissipates before it can act on any spores that germinate in product.

The manufacturer of DMDC reports that the concentration of DMDC required to stabilize beverage for a period of 16 weeks against the outgrowth of vegetative forms of yeast, mold, and bacteria is at least 250 mg/liter. This is the legal limit for use inside of the U.S. In the present invention, DMDC is used at a concentration of between about 75 mg/L and 250 mg/L, generally between about 100 mg/L and about 200 mg/L.

It should be noted that pimaricin is relatively tolerant to short exposures to heat and that it is fully within the scope of the invention to employ pimaricin-cyclodextrin complex in conjunction with a thermal process. Following a thermal process that destroys vegetative forms of fungi and bacteria, pimaricin would be present to address the consequences of mold spore germination. Typically, a thermal process of 2 minutes at 140° F. is sufficient to provide product that is commercially sterile relative to bacteria, vegetative yeast and mold. Pimarcin degrades at 356° F.

Aspects of the invention are directed to preserve a broad range of beverage products against spoilage by yeast, mold and a range of acid tolerant bacteria. The beverage products possess a pH of up to 7.5, in particular up to 5.6, such as 2.5 to 5.6, 2.5 to 4.6, or 2.6 to 3.8. Preservation of product can be accomplished merely through the addition of the chemical agents described herein, but it is also possible to supplement the action of the chemicals with purely physical forms of preservation such as alteration of product temperature, various wavelengths of irradiation, pressure or combinations thereof.

In solution by itself, pimaricin will exhibit a pH. Similarly, a mixture of pimaricin, cyclodextrin and povidone (preservation system) in water will exhibit a pH. However, the pH of the preservative system in and of itself is not particularly relevant. Only a very small amount will be added to beverage and the pH of the beverage will dominate. The pH of the beverage containing the preservative system can be adjusted to any specified value.

The pimaricin-cyclodextrin complex can be complemented by the presence of other substances known to possess antimicrobial activity. Combining two or more antimicrobial substances into a single formulation allows for the possibility of a "multiple hurdle effect" wherein multiple metabolic processes are inhibited to a degree that the organism is unable to grow and reproduce. Substances such as sequestrants, organic acids and phenolic compounds, such as terpenes, can be employed with pimaricin.

The beverage preservative system may further comprise sorbic acid, cinnamic acid, salt of cinnamic acid, or a mixture of sorbic and cinnamic acid, alkali salts of sorbic acid (K+, Na+) and/or alkali salts of cinnamic acid (K+, Na+) that result in specific concentrations of cinnamic or sorbic acid as determined by final beverage pH.

The beverage preservative system may further comprise a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), and mixtures thereof, and a pH of 5.8 or less; wherein the beverage preservative system prevents spoilage by microorganisms in a beverage within a sealed container for a period of at least 16 weeks.

The beverage preservative system may further comprise sodium hexametaphosphate (SHMP), sodium acid metaphosphate (SAMP), or mixture of SHMP and SAMP to a prescribed total amount. Within the pH range of 2.5 to 5.8, SAMP and SHMP can substitute for one another in a ratio of 1:1 without compromise to anti-microbial effect. Substitution of one for other is often an issue of sensory perception, particularly "mouth feel".

The beverage preservative system may further comprise phosphonate to a prescribed total amount wherein the composition contains any number of types of phosphonate structures such that a total amount of phosphonate is achieved.

The beverage preservative system may further comprise bis-phosphonate to a prescribed total amount wherein the composition contains any number of types of bis-phosphonate structures such that a total amount of bis-phosphonate is achieved.

The beverage preservative system may further comprise N-bis-phosphonate to a prescribed total amount wherein the composition contains any number of types of N-bis-phosphonate structures such that a total amount of bis-phosphonate is achieved.

The beverage preservative system may further comprise a radical scavenger (antioxidant) such as ascorbic acid wherein the anti-oxidant-scavenger has a defined role as a component of the beverage preservative system.

In some instances of any of the embodiments describes above, EDTA may need to be present where the purpose is to stabilize chemical ingredients. When it is added for this purpose, it will fulfill the un-intended second role should it participate as an un-intended antimicrobial preservative. To fulfill the role of stabilization of chemical ingredients, EDTA need not be present in an amount greater than 30 mg/L or an amount of EDTA in place of bio-degradable sequestrants that does not exceed 45 mg/L.

In general, the beverage preservative system or beverage product of invention should have a total concentration of chromium, aluminum, nickel, zinc, copper, manganese, cobalt, calcium, magnesium, and iron cations in the range of about 1.0 mM or less, e.g., about 0.5 mM to 0.75 mM, about 0.54 mM or less. The present invention may optionally include the use water to batch product that has been treated to remove metal cations. As opposed to the teachings of U.S. Pat. No. 6,268,003, the preferred method of treatment is via physical processes reverse osmosis and or electro-deionization. Treatment by chemical means, as taught in U.S. Pat. No. 6,268,003 is acceptable, but is not preferred. The use of chemical means to reduce water hardness often results in an increase in the concentration of specific mono-valent cations, e.g., potassium cations, that serve to compromise the invention described herein. In certain exemplary embodiments, the added water has been treated by reverse osmosis, electro-deionization or both to decrease the total concentration of metal cations of chromium, aluminum, nickel, zinc, copper, manganese, cobalt calcium, magnesium, and iron to about 1.0 mM or less.

As commonly understood in the art, the definitions of the terms "preserve," "preservative," and "preservation" do not provide a standard time period for how long the thing to be preserved is kept from spoilage, decomposition, or discoloration. The time period for "preservation" can vary greatly depending on the subject matter. Without a stated time period, it can be difficult or impossible to infer the time period required for a composition to act as a "preservative."

As used herein, the terms "preserve," "preservative," and "preservation" refer to a food or beverage product protected against or a composition able to stop or completely prevent spoilage of a product that is the result of the growth of spoilage microorganisms for a period of at least 16 weeks. This period is in keeping with the time required to transport a beverage product from location of manufacture, through distribution channels, into the hand of the consumer. Absence of spoilage is noted by absence any evidence of growth of spoilage organisms (turbidity, viable count, direct microscopic count or other standard methods of enumeration) and by the absence of any discernable change in the product attributes that could be routinely attributed to metabolism of spoilage organisms.

As used herein, the term "inhibit" is understood to mean stop or to prevent completely.

Typically, the product is preserved under ambient conditions, which include the full range of temperatures experienced during storage, transport, and display (e.g., 0° C. to 40° C., 10° C. to 30° C., 20° C. to 25° C.) without limitation to the length of exposure to any given temperature.

"Minimal inhibitory concentration" (MIC) is another term for which no standard time period is routinely defined or understood. In the medical fields, MIC is frequently employed to designate the concentration of a substance which prohibits the growth of a single type of microorganism in over-night incubation as compared to a positive control without the substance (see Wikipedia). However, the rest of the scientific community has adopted the term MIC to mean any of a number of conditions of period of incubation and degree of inhibition.

Even within the medical field, it is recognized that an MIC value developed over a period of 24 hours incubation may not be the same value developed after 48 hours or longer. Otherwise stated, a substance may exhibit an observable MIC during the first 24 hours of an experiment, but exhibit no measurable MIC relative to the positive control after 48 hours.

Beverage products according to the present invention include both still and carbonated beverages. Herein, the term carbonated beverage is inclusive of any combination of water, juice, flavor and sweetener that is meant to be consumed as an alcohol free liquid and which also is made to possess a carbon dioxide concentration of 0.2 volumes of $CO_2$ or greater. The term "volume of $CO_2$" is understood to mean a quantity of carbon dioxide absorbed into the liquid wherein one volume $CO_2$ is equal to 1.96 grams of carbon dioxide ($CO_2$) per liter of product (0.0455M) at 25° C. Non-inclusive examples of carbonated beverages include flavored seltzer waters, juices, cola, lemon-lime, ginger ale, and root beer beverages which are carbonated in the manner of soft drinks, as well as beverages that provide health or wellness benefits from the presence of metabolically active substances, such as vitamins, amino acids, proteins, carbohydrates, lipids, or polymers thereof. Such products may also be formulated to contain milk, coffee, or tea or other botanical solids. It is also possible to formulate such beverages to contain one or more nutraceuticals. Herein, a nutraceutical is a substance that has been shown to possess, minimally, either a general or specific health benefit or sense of wellness as documented in professional journals or texts. Nutraceuticals, however, do not necessarily act to either cure or prevent specific types of medical conditions.

Herein, the term "still beverage" is any combination of water and ingredient which is meant to be consumed in the manner of an alcohol free liquid beverage and which possesses no greater than 0.2 volumes of carbon dioxide. Non-inclusive examples of still beverages include flavored waters, tea, coffee, nectars, mineral drinks, sports beverages, vitamin waters, juice-containing beverages, punches or the concentrated forms of these beverages, as well as beverage concentrates which contain at least about 45% by weight of juice. Such beverages may be supplemented with vitamins, amino acids, protein-based, carbohydrate-based or lipid-based substances. As noted, the invention includes juice containing products, whether carbonated or still. "Juice containing beverages" or "Juice beverages", regardless of whether still or carbonated, are products containing some or all the components of a fruit, vegetable or nuts or mixture thereof that can either be suspended or made soluble in the natural liquid fraction of the fruit.

The term "vegetable," when used herein, includes both fruiting and the non-fruiting but edible portion of plants such as tubers, leaves, rinds, and also, if not otherwise indicated, any grains, nuts, beans, and sprouts which are provided as juices or beverage flavorings. Unless dictated by local, national or regional regulatory agencies the selective removal of certain substances (pulp, pectins, etc) does not constitute an adulteration of a juice.

By way of example, juice products and juice drinks can be obtained from the fruit of apple, cranberry, pear, peach, plum, apricot, nectarine, grape, cherry, currant, raspberry, gooseberry, blackberry, blueberry, strawberry, lemon, orange, grapefruit, passionfruit, mandarin, mirabelle, tomato, lettuce, celery, spinach, cabbage, watercress, dandelion, rhubarb, carrot, beet, cucumber, pineapple, custard-apple, coconut, pomegranate, guava, kiwi, mango, papaya, watermelon, lo han guo, cantaloupe, pineapple, banana or banana puree, lemon, mango, papaya, lime, tangerine, and mixtures thereof. Preferred juices are the citrus juices, and most preferred are the non-citrus juices, apple, pear, cranberry, strawberry, grape, papaya, mango and cherry.

The invention could be used to preserve a formulation that is essentially 100% juice but the product cannot be labeled to contain 100% juice. The invention can be used in products containing juice wherein juice concentration is below 100%. Lowering of juice concentration below 10% will typically favor the use of lowered concentrations of preservatives. Formulations containing juice concentrations as high as 10% may be preserved by this invention and certainly a beverage containing less than 10% juice would be preserved by this invention a beverage containing no more than 5% juice would be preserved by this invention. Any juice can be used to make the beverage of this invention. If a beverage concentrate is desired, the fruit juice is concentrated by conventional means from about 12° Brix to about 65° Brix. Beverage concentrates are usually 40° Brix or higher (about 40% to about 75% sugar solids).

Typically, beverages will possess a specified range of acidity. Acidity of a beverage is largely determined by the type of acidulant, its concentration, and the propensity of protons associated with the acid to dissociate away from the acid when the acid is entered into solution ($pk_A$). Any solution with a measurable pH between 0-14 possesses some, as reflected in the measurable or calculable concentration of free protons. However, those solutions with pH below 7 are generally understood to be acidic and those above pH 7 are understood to be basic. The acidulant can be organic or inorganic. A non-exclusive example of inorganic acids is phosphoric acids. Non-exclusive examples of organic acids are citric, malic, ascorbic, tartaric, lactic, gluconic, and succinic acids. Non-exclusive examples of inorganic acids are the phosphoric acid compounds and the mono- and di-potassium salts of these acids. (Mono- and di-potassium salts of phosphoric acid possess at least one proton that can contribute to acidity).

The various acids can be combined with salts of the same or different acids in order to manage pH or the buffer capacity of the beverage to a specified pH or range of pH. The invention can function at a pH as low as 2.6, but the invention will better function as the pH is increased from 2.6 up to pH 7.2. For high acidic beverages, the invention is not limited by the type of acidulant employed in acidifying the product. Virtually any organic acid salt can be used so long as it is edible and does not provide an off-flavor. The choice of salt or salt mixture will be determined by the solubility and the taste. Citrate, malate and ascorbate yield ingestible complexes whose flavors are judged to be quite acceptable, particularly in fruit juice beverages. Tartaric acid is acceptable, particularly in grape juice beverages, as is lactic acid. Longer-chain fatty acids may be used but can affect flavor and water solubility. For essentially all purposes, the malate, gluconate, citrate and ascorbate moieties suffice.

Certain exemplary embodiments of the beverage product of invention include sports (electrolyte balancing) beverages (carbonated or non-carbonated). Typical sport beverages contain water, sucrose syrup, glucose-fructose syrup, and natural or artificial flavors. These beverages can also contain sodium chloride, citric acid, sodium citrate, mono-potassium phosphate, as well as other natural or artificial substances which serve to replenish the balance of electrolytes lost during perspiration.

In certain exemplary embodiments, the present invention also includes beverage formulations supplemented with fat soluble vitamins. Non-exclusive examples of vitamins include fat-soluble vitamin E or its esters, vitamin A or its esters, vitamin K, and vitamin D3, especially vitamin E and vitamin E acetate. The form of the supplement can be powder, gel or liquid or a combination thereof. Fat-soluble vitamins may be added in a restorative amount, i.e. enough to replace vitamin naturally present in a beverage such as juice or milk, which may have been lost or inactivated during processing. Fat-soluble vitamins may also be added in a nutritionally supplemental amount, i.e. an amount of vitamin considered advisable for a child or adult to consume based on RDAs and other such standards, preferably from about one to three times the RDA (Recommended Daily Amount). Other vitamins which can be added to the beverages include vitamin B niacin, pantothenic acid, folic acid, vitamin D, vitamin E, vitamin B and thiamine. These vitamins can be added at levels from 10% to 300% RDA.

Supplements: The invention can be compromised by the presence of certain types of supplements but it is not an absolute and it will vary from beverage formulation to beverage formulation. The degree to which the invention is compromised will depend on the nature of the supplement and the resulting concentration of specific metal cations in the beverage as a consequence of the presence of the supplement. For example, calcium supplements can compromise the invention, but not to the same degree as chromium supplements. Calcium supplements may be added to the degree that a critical value total calcium concentration is not exceeded Calcium sources that are compatible with the invention include calcium organic acid complexes. Among the preferred calcium sources is "calcium citrate-malate", as described in U.S. Pat. No. 4,786,510 and U.S. Pat. No. 4,786,518 issued to Nakel et al. (1988) and U.S. Pat. No. 4,722,847 issued to Heckert (1988). Other calcium sources compatible with the invention include calcium acetate, calcium tartrate, calcium lactate, calcium malate, calcium citrate, calcium phosphate, calcium orotate, and mixtures thereof. Calcium chloride and calcium sulfate can also be included; however at higher levels they taste astringent.

Flavor Component: Beverage products according to the present invention can contain flavors of any type. The flavor component of the present invention contains flavors selected from artificial, natural flavors, botanical flavors fruit flavors and mixtures thereof. The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, kola, tea, and the like. Botanical flavors can be derived from natural sources such as essential oils and extracts, or can be synthetically prepared. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

Artificial flavors can also be employed. Non-exclusive examples of artificial flavors include chocolate, strawberry, vanilla, cola, or artificial flavors that mimic a natural flavor can be used to formulate a still or carbonated beverage flavored to taste like fruit. The particular amount of the flavor component effective for imparting flavor characteristics to the beverage mixes of the present invention ("flavor enhancing") can depend upon the flavor(s) selected, the flavor impression desired, and the form of the flavor component. The flavor component can comprise at least 0.005% by weight of the beverage com position.

On a case by case basis, the beverage preservative system according to the present invention is compatible with beverages formulated to contain aqueous essence. As used herein, the term "aqueous essence" refers to the water soluble aroma and flavor materials which are derived from fruit juices. Aqueous essences can be fractionated, concentrated or folded essences, or enriched with added components. As used herein, the term "essence oil" refers to the oil or water insoluble fraction of the aroma and flavor volatiles obtained from juices. Orange essence oil is the oily fraction which separates from the aqueous essence obtained by evaporation of orange juice. Essence oil can be fractionated, concentrated or enriched. As used herein, the term "peel oil" refers to the aroma and flavor derived from oranges and other citrus fruit and is largely composed of terpene hydrocarbons, e.g. aliphatic aldehydes and ketones, oxygenated terpenes and sesquiterpenes. From about 0.002% to about 1.0% of aqueous essence and essence oil are used in citrus flavored juices.

Sweetener Component: The microbiological preservation function of the present invention in single strength beverage formulation is not affected by the type of sweeteners present in the beverage. The sweetener may be any sweetener commonly employed for use in beverages. Sweeteners suitable for use in various embodiments of the beverages disclosed here include nutritive and non-nutritive, natural and artificial or synthetic sweeteners. The sweetener can include a monosaccharide or a disaccharide. A certain degree of purity from contamination by metal cations will be expected. Peptides possessing sweet taste are also permitted. The most commonly employed saccharides include sucrose, fructose, dextrose, maltose and lactose and invert sugar. Mixtures of these sugars can be used. Other natural carbohydrates can be used if less or more sweetness is desired. Suitable non-nutritive sweeteners and combinations of such sweeteners are selected for the desired nutritional characteristics, taste profile for the beverage, mouthfeel and other organoleptic factors. Non-nutritive artificial sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example, sorbitol, mannitol, xylitol, glycyrrhizin, D-tagatose, erythritol, meso-erythritol, malitol, maltose, lactose, fructo-oligosaccharides, Lo Han Guo powder, mogroside V, glycyrrhizin, steviol glycosides, e.g., rebaudioside A, rebaudioside B, rebaudioside C, rebaudioside D, rebaudioside E, steviolbioside, stevioside, dulcoside A etc., *Stevia rebaudiana* extract, acesulfame, aspartame, other dipeptides, cyclamate, sucralose, saccharin, xylose, arabinose, isomalt, lactitol, maltitol, trehalose, ribose, monatin, and protein sweeteners such as thaumatin, monellin, brazzein, D-alanine, and glycine, related compounds, and mixtures of any of them. It will be within the ability of those skilled in the art, given the benefit of this disclosure, to select suitable non-nutritive and nutritive sweeteners and combinations thereof. The amount of the sweetener effective in the beverage mixes of the invention depends upon the particular sweetener used and the sweetness intensity desired.

Head space atmosphere: The presence of air in the headspace of the beverage product will have no measurable impact on the composition of the invention. The presence of carbon dioxide gas or other gases that cause the exclusion of oxygen from the beverage (nitrogen, nitrous oxide, etc) may permit the use of reduced concentrations of chemical preservatives employed along with the sequestrants. The concentration of sequestrants required will be dictated only by the type and amount of metal cations that are present in the beverage product.

As stated previously, a likely arrangement of the complex between cyclodextrins and pimaricin is offered in FIG. 1. The arrangement is theoretical and is based largely on the fact that the carboxylic acid and amino groups impart a polarity on the end (side) of pimaricin that would preferentially interact with the water portion of a solvent. The opposite end (side) of pimaricin is largely hydrophobic and exhibits a dimension (van der waals radius+bond length) that should readily permit inclusion into both β and γ cyclodextrins. A smaller fraction of pimaricin will be able to fit into an alpha cyclodextrin molecule. The invention is not bound by this theoretical depiction of the complex. The most exacting proof of the formation of a complex is the difference in relative solubility of pimaricin in the presence of cyclodextrin relative to solubility limit in the absence of cyclodextrin. There are numerous analytical tools to establish the concentration of pimaricin but UV-visible spectroscopy is the simplest.

Figure 2:
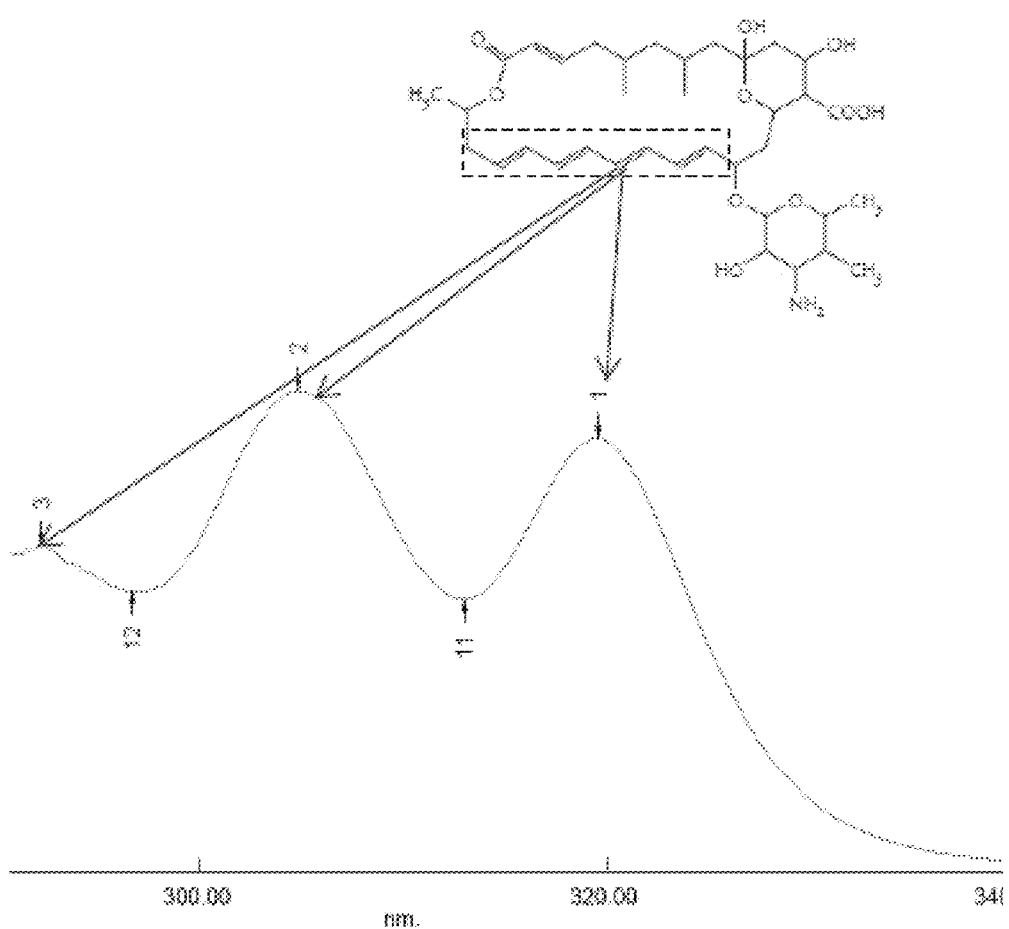
FIG. 2 shows a UV-spectrogram of Pimaricin (for purpose of quantification)

Turning to FIG. 2, it can be seen that Pimaricin exhibits a distinctive UV absorption profile. Peaks 1, 2, & 3 are understood to be attributable to the conjugate chromophore that exists as a consequence of the polyene (all trans tetraene) structure as highlighted (dotted rectangle). Cyclodextrins (alpha, beta, and gamma) do not measurably absorb UV light in the region of 280-340 nm and so it is readily possible to establish the concentration of Pimaricin in solution or in complex through basic application of Beers Law.

Figure 3:
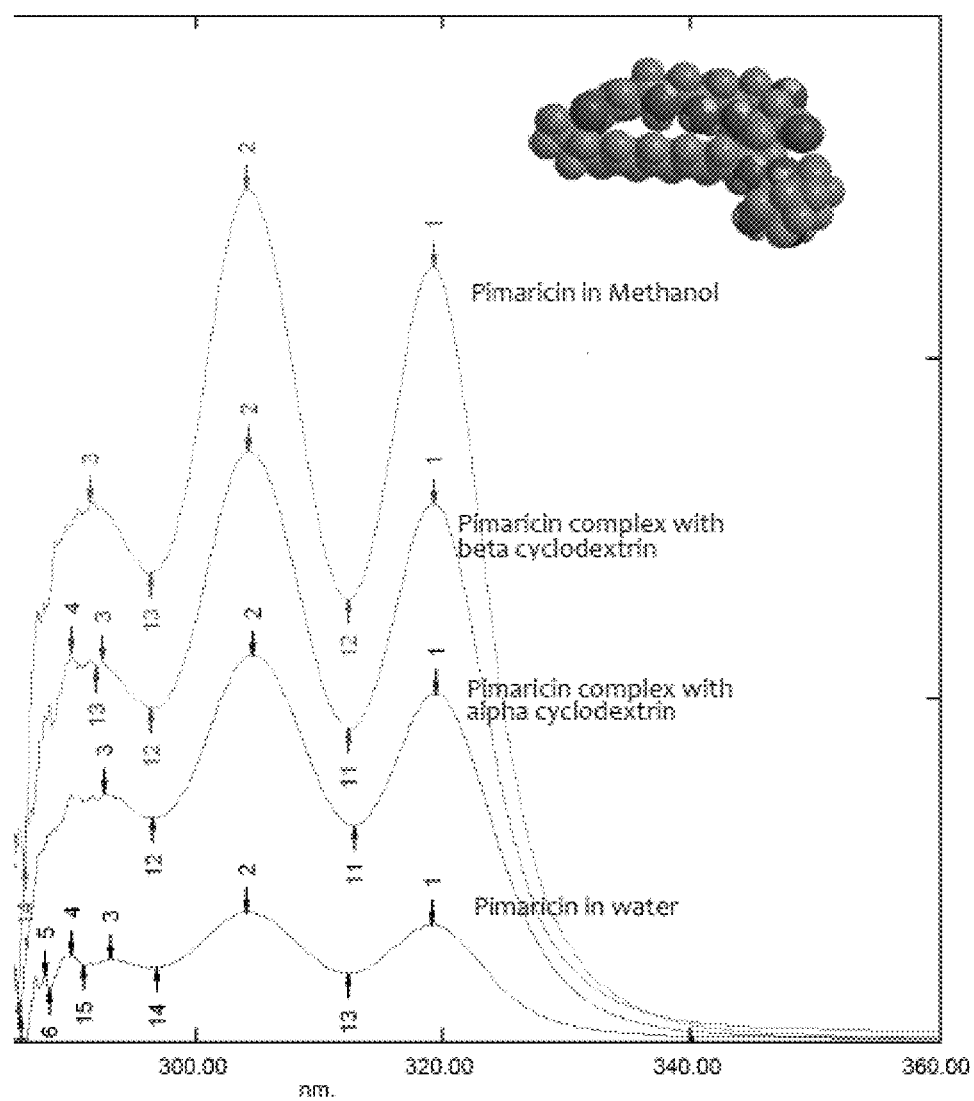
FIG. 3 shows spectra for Pimaricin in methanol, in water, and in complex with beta and alpha cyclodextrin.

FIG. 3 shows the spectra for Pimaricin in methanol, Pimaricin in complex with either a-cyclodextrin or b-cyclodextrin and Pimaricin in water. Upon close inspection, the spectra reveal two factors that are suggestive of a complex between cyclodextrin and Pimaricin. First, relative to Pimaricin in water, Pimaricin in methanol and Pimaricin in the presence of the cyclodextrins exhibit a slight blue shift (hypogochromic) of peak 3. Secondly, height ratio of peak 2 relative to 1 changes for Pimaricin in methanol or in complex with cyclodextrin relative to water. A similar, but less dramatic, change in peak height ratio exists between cyclodextrin-pimaricin complex and pimaricin in water. Both the change in ratio of peak height and the blue shift are indicative of the formation of a complex between cyclodextrin and Pimaricin. Most importantly, Pimaricin in complex with cyclodextrin is measurably greater than can be achieved in the absence of cyclodextrin. (This figure does not depict relative maximum concentrations. For purpose of this presentation, solutions of α-cylodextrin-pimaricin complex and pimaricin in water are diluted 10 fold and the solutions of pimaricin in methanol and complexed with β-cylcodextrin are diluted 100 fold)

FIG. 4 shows a typical test grid for the establishing the tolerance toward Pimarcin in complex with cyclodextrin among an array of different bio-indicator mold fungi. Typically, a beverage is prepared in two aliquots, one with and one without Pimaricin. The two aliquots can be mixed together in different proportions in order to obtain a range of concentrations of Pimaricin. In this particular example, Pimaricin was tested in the absence of cyclodextrin and so the limit of solubility in beverage of pH 3.4 is about 20 ppm. Samples demonstrating growth are differentiated from samples free of growth after 16 weeks by solid versus open dots respectively.

EXAMPLE 1

Pimaricin exhibits a solubility limit in water of about 52 ppm according to reports in the literature. Typically, organic acids are less soluble at lower pH, reflecting the impact of the protonation of various carboxylic acid groups. The presence of a carboxylic group at carbon 24 in the carbon backbone of Pimaricin should, predictably, lower the solubility of Pimaricin still further when Pimaricin is present in an acid environment. These facts are consistent with findings that the solubility limit of Pimaricin in aqueous based high acid beverage is about 20 ppm at ambient temperature (25° C.) and 10 ppm in the same beverage at 4° C. The following example provides an illustration of the inability to Pimaricin to prohibit spoilage when the concentration of Pimaricin is restricted to its natural limit of solubility (stand-alone concentration).

A 2% fruit juice based non-carbonated beverage of pH 3.4 and about 12 Brix was formed by combining the following ingredients.

| Added Water | Approximately 84% water |
|---|---|
| Apple Juice Concentrate | About 0.372% to provide single strength concentration of about 2% |
| Sucrose | 6.8% |
| Glucose | 5.2% |
| Fructose | 0.2% |
| Pimaricin | 0-0.002% (final concentration) |
| Malic acid | 0.134% |
| Sodium Malate | 0.013% |
|  | (approximately, adjusting pH to 3.4) |
| $CaCl_2$—$2H_2O$ | 0.011% |
| $MgCl_2$—$6H_2O$ | 0.003% |

The preparation of beverage was divided into two aliquots. To one aliquot was added Pimaricin (0.003% or 30 ppm). The preparation containing Pimaricin was stirred for 24 hours at room temperature to ensure maximum solubility of Pimaricin. Following the preparation was filtered through a 0.22 micron filter in order to remove the fraction of Pimaricin that did not enter solution. The final concentration of Pimaricin was established spectrophotometrically at 20.0 ppm The aliquot of beverage containing Pimaricin and the preparation of beverage lacking Pimaricin (also filter sterilized) were mixed in different ratios such that a range of Pimaricin concentrations was achieved ranging from 0 to 20.0 ppm. Each of 24 such preparations was then divided equally across 8 separate tubes making for 192 samples. Spores from each of 7 different mold species were then inoculated separately into tubes containing beverage such that each mold would be challenged to grow over the full concentration range of Pimaricin. At each concentration of Pimaricin the $8^{th}$ tube of a set served as a negative control. The tubes were sealed in a manner that prohibits moisture evaporation. Samples were then incubated at 25° C. for a period of 16 weeks or until all test samples exhibited visual evidence of mold growth.

The mold spores employed were obtained from the following organisms. *Aspgergillus niger* isolate of Pepsi; ATCC strain 90900 (*Talaromyces spectabilis*), ATCC strain 48441 (*Pencillium galbrum*), ATCC 24088 (*Byssochlamys fulva*), ATCC 96468 (*Neosartorva fischeri*) ATCC strain 96463 (*Talaromyces flavus*) and ATCC strain ATCC 10512 (*Talaromyces flavus* var. *flavus*). Each spore type was present at 20 spores per milliliter.

As evident in Table 1, the majority of mold (>50%) were able to grow at the highest concentration of Pimaricin present in solution. The results suggest that Pimaricin at its natural limit of solubility demonstrates a rather narrow spectrum of activity. Here, the term "spectrum" refers to the range of organism types (genus and species) which exhibit sensitivity to Pimaricin. Rarely does a narrow spectrum antimicrobial find use as a food or beverage preservative. Typically, antimicrobial compounds need to be relatively broad spectrum in their activity in order to be effective as a food or beverage preservative. In this instance, broad spectrum is intended to mean that a substance is effective in prohibiting growth of a measurably large fraction of yeast and mold fungi and that this point is established through testing of representative strains, species and genus.

Consequently, the results of the study depicted in Table 1 are not supportive of the use of Pimaricin as a stand alone preservative for still beverages.

TABLE 1

MIC for un-complexed PIMARICIN

| Organism | Strain | Spore Generation | T (C.°) for generation of spores | 16 week incubation MIC (ppm) |
|---|---|---|---|---|
| *Aspergillus* | Pepsi Isolate | Potato Dextrose | 25 | 18.4 |
| *Talaromyces spectabilis* | ATCC 90900 | Potato Dextrose | 25 | 10.3 |
| *Penicillium glabrum* | ATCC 48441 | Potato Dextrose | 25 | 5.7 |
| *Byssochlamys fulva* | ATCC 10099 | Potato Dextrose | 25 | 16.9 |
| *Neosartorya fischeri* | ATCC 96468 | Potato Dextrose | 25 | >20 |
| *Talaromyces flavus* | ATCC 96463 | Potato Dextrose | 25 | >20 |
| *Talaromyces flavus* var. *flavus* | ATCC 10512 | Potato Dextrose | 25 | >20 |

EXAMPLE 2

Pimaricin exhibits a solubility limit in water of about 20 ppm at ambient temperature (25° C.) and 10 ppm in the same beverage at 4° C. in a high acid beverage of pH 3.4. If it were possible to enhance the solubility of Pimaricin, it is likely that Pimaricin would inhibit a broader range of spoilage organisms. In other words, the spectrum of Pimaricin could be extended if the solubility of Pimaricin in solution can be extended. The following example provides an illustration of a broader spectrum of efficacy of Pimaricin when present in solution beyond the normal limit of aqueous phase solubility.

The increased concentration of Pimaricin is accomplished through the complexation with cyclodextrins. In this particular example, Beta (β) cyclodextrin is employed as the "host" molecule to the "guest" molecule of pimaricin. During preparation of the cyclodextrin complex with pimaricin, several different ratios of cyclodextrin:pimaricin are likely to form. The complex that predominates is understood to be 1:1 β-cyclodextrin:pimaricin. A 2% fruit juice based non-carbonated beverage of pH 3.4 and about 12 Brix was formed by combining the following ingredients.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Pimaricin-β-CD | 0-0.04% pimaricin (maximum final concentration) |
| Malic acid | 0.134% |
| Sodium Malate | 0.013% (approximately, adjusting pH to 3.4) |
| $CaCl_2$—$2H_2O$ | 0.011% |
| $MgCl_2$—$6H_2O$ | 0.003% |

The preparation of beverage was divided into two aliquots. One of two aliquots was made to contain 400 ppm Pimaricin (0.04%) by way of an inclusion complex with β-cyclodextrin. Establishing the concentration of pimaricin in solution is readily achieved by means of UV-spectrophotometry. (This is not to mean that the limit of solubility of pimaricin in solution with cyclodextrin is 400 ppm. Concentrations in excess of 1000 ppm are readily obtained with either (β or γ cyclodextrin).

The second aliquot of beverage is identical to the 1$^{st}$ aliquot except for the presence of cyclodextrin-pimaricin complex. The aliquot of beverage containing Pimaricin and the preparation of beverage lacking Pimaricin (also filter sterilized) were mixed in different ratios such that a range of Pimaricin concentrations was achieved ranging from 0 to 400.0 ppm. Each of 36 such preparations was then divided equally across 8 separate tubes making for 288 samples. Spores from each of 7 different mold species were then inoculated separately into tubes containing beverage such that each mold would be challenged to grow over the full concentration range of Pimaricin. At each concentration of Pimaricin the 8$^{th}$ tube of a set served as a negative control. The tubes were sealed in a manner that prohibits moisture evaporation. Samples were then incubated at 25° C. for a period of 16 weeks or until all test samples exhibited visual evidence of mold growth.

The mold spores employed were obtained from the following organisms *Paecilomyces puntoni* (Pepsi isolate D3), ATCC 36614 (*Byssochlamys nieva*) ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus*). Each spore type was present initially at 20 spores per milliliter of product. Spores for *Byssochlamys nieva* were developed at both 25° C. on Potato Dextrose and 30° C. on Malt Extract in order to ensure some variation in the ratio of asci (ascospores) to conidiospores.

As evident in Table 2, the vast majority of bio-indicator mold species (~86%) were unable to grow at the highest concentration of Pimaricin present in solution (400 ppm). The results clearly indicate that Pimaricin alone, when present at concentrations in excess of 200 ppm, can be adequate to allow commercial production of many beverage products. In many instances, concentrations as low as 50 to 100 ppm Pimaricin might suffice if the shelf life expectation is measured in days versus weeks as will be the case for certain fountain formulations. Because nearly all type of product is exposed to refrigeration temperatures during distribution, storage or display, any concentration of pimaricin above 10-15 ppm becomes an issue unless the problem is bridged by the inclusion of pimaricin into complex with cyclodextrins.

TABLE 2

| Organism | Strain Designation | Medium to develop spore crop | Incubation Temperature (C.) during sporulaiton | 16 week incubation MIC (ppm) |
|---|---|---|---|---|
| Paecilomyces puntoni | D3-Pepsi | Potato Dextrose | 25 | 18 |
| Byssochlamys nieva | ATCC 36614 | Potato Dextrose | 25 | 18 |
| Byssochlamys fulva | ATCC 24088 | Potato Dextrose | 25 | 18 |
| Byssochlamys fulva | ATCC 24088 | Malt Extract | 30 | 18 |
| Neosartorya fischeri | ATCC 96468 | Potato Dextrose | 25 | 32 |
| Talaromyces flavus | ATCC 96463 | Potato Dextrose | 25 | 400 |
| Talaromyces flavus var. flavus | ATCC 10512 | Potato Dextrose | 25 | 39 |

The tolerance of *Talaromyces flavus* to Pimaricin is not particularly surprising. Pimaricin is classified as a polyene and a number of pathogenic mold species have been reported as tolerant or resistant to polyene antifungal substances that are commonly employed in medical applications (Amphotericin B). Apparently, some fungal organisms are able to reduce the amount of ergosterol that is present in the membrane when confronted with Pimaricin or similarly structured polyenes. In so doing, the organism reduces the opportunity for Pimaricin to interact or bind to ergosterol; a necessary first step in the mode of action (MOA) for pimaricin. Such a mechanism is not resistance but is instead tolerance in that the genes required for tolerance are not readily transmitted across species or genus. It should also be noted that the organisms that exhibited relatively low sensitivity to Pimaricin in the absence of a complex with cyclodextrin seem every bit as sensitive to the form of Pimaricin present in the complex with cyclodextrin. This result is unexpected in that it was possible that the complex would not release Pimaricin to the cell if the binding constant between Pimaricin and the cyclodextrin measurably exceeded the binding constant of Pimaricin to its host bio-molecule present in the cell envelope of the fungi.

EXAMPLE 3

The fact that one or more bio-indicator mold demonstrated tolerance to Pimaricin over a period of 16 weeks does not exclude the possibility of employing cyclodextrin complex Pimaricin as a standalone preservative. At the same time, if other substances are identified which provide an additive antimicrobial effect to Pimaricin, then an option will exist for providing additional assurance of product stability for as much as 16 weeks. To this end, cyclodextrin in complex with Pimaricin was tested in combination with other chemical agents to establish if such combinations were more effective than Pimaricin alone.

An apple juice based beverage was prepared to contain 30 ppm EDTA (0.003%) as shown below. The beverage was divided into two aliquots. One aliquot was supplemented with Pimaricin in complex with β-cyclodextrin to achieve a final Pimaricin concentration of 400 ppm. As described previously, the portions of two aliquots were mixed in various ratios to achieve a range of concentrations of Pimaricin of 0 to 400 ppm. The preparations of Pimaricin at were distributed to separate tubes permitting the challenge of each of 7 different bio-indicator molds for each prepared concentration of Pimaricin.

| Added Water | Approximately 84% water |
|---|---|
| Apple Juice Concentrate | About 0.372% to provide single strength concentration of about 2% |
| Sucrose | 6.8% |
| Glucose | 5.2% |
| Fructose | 0.2% |
| Pimaricin (in complex with β-cyclodextrin) | 0-0.04% (maximum final concentration) |
| Malic acid | 0.134% |
| Sodium Malate | 0.013% (approximately, adjusting pH to 3.4) |
| $CaCl_2$—$2H_2O$ | 0.011% |
| $MgCl_2$—$6H_2O$ | 0.003% |
| EDTA | 0.003% |

The results of the study (Table 3) are somewhat surprising in that none of the bio-indicator mold grew in the presence of 30 ppm EDTA and Pimaricin when the concentration of Pimaricin was at least 160 ppm.

TABLE 3

| Organism | Strain Designation | Medium to develop spore crop | Incubation Temperature (C.) during sporulaiton | 16 week incubation MIC (ppm) |
|---|---|---|---|---|
| *Paecilomyces puntoni* | D3-Pepsi | Potato Dextrose | 25 | 11 |
| *Byssochlamys nieva* | ATCC 36614 | Potato Dextrose | 25 | 11 |
| *Byssochlamys fulva* | ATCC 24088 | Potato Dextrose | 25 | 11 |
| *Byssochlamys fulva* | ATCC 24088 | Malt Extract | 30 | 11 |
| *Neosartorya fischeri* | ATCC 96468 | Potato Dextrose | 25 | 24 |
| *Talaromyces flavus* | ATCC 96463 | Potato Dextrose | 25 | <160 |
| *Talaromyces flavus* var. *flavus* | ATCC 10512 | Potato Dextrose | 25 | 28 |

Although the presence of EDTA is additive in some manner for the action of benzoic and sorbic acid, EDTA is not generally understood to exhibit measurable antifungal activity of its own nor is it generally understood to be broadly additive in action with all antimicrobial substances. In fact, EDTA is often employed as a supplement to microbial growth medium to ensure availability of certain cations. Not to be bound by theory, but it appears that the affect of EDTA in the presence of Pimaricin may be something other than simply the sequestering of divalent cations.

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 4

The results of Example 3 were measurably favorable and although the exact interaction between EDTA and Pimaricin is unclear, it seemed reasonable to anticipate that Pimaricin in combination with two or more sequestrants might also yield favorable results. To this end, a beverage was formulated to contain both 30 ppm EDTA and 750 ppm Sodium Hexametaphosphate. As in the case of the previous example, the prepared beverage was divided into two aliquots. To one of the aliquots is added Pimaricin in complex with β-cyclodextrin such that the final concentration of Pimaricin is 400 ppm (0.04%)

| Ingredient | % composition |
|---|---|
| Water | 92 |
| Apple Juice Concentrate | 0.372% of concentrate to provide single strength concentration of about 2% |
| Sucrose | 6.8 |
| Glucose | 5.2 |
| Fructose | 0.2 |
| Pimaricin-β-cyclodextrin | 0-0.04% (as Pimaricin) |
| Malic acid | 0.134% |
| Sodium Malate | 0.013% |
| $CaCl_2$—$2H_2O$ | 0.011% |
| $MgCl_2$—$6H_2O$ | 0.003% |
| EDTA | 0.003% |
| Sodium Hexametaphosphate | 0.075% |

The two aliquots were then mixed in different ratios in order to obtain 24 separate preparations of beverage that collectively exhibited a range of Pimaricin concentrations of 0 to 400 ppm. 11 ppm Pimaricin is the lowest concentration of Pimaricin test. The volume of the beverage any each particular concentration of Pimaricin was sub-divided among 8 containers and seven containers at each concentration of Pimaricin were inoculated with a separate bio-indicator mold fungi. One sample remained un-inoculated and served as a negative control. Each mold was separately inoculated into sample volumes lacking Pimaricin but possessing EDTA & SHMP. These samples served as the positive controls in this test. Samples were held at 25° C. for period of 16 weeks before a final assessment of reported MIC shown in Table 4.

TABLE 4

| Organism | Strain Designation | Medium to develop spore crop | Incubation Temperature (C.) during sporulaiton | 16 week incubation MIC (ppm) |
| --- | --- | --- | --- | --- |
| Paecilomyces puntoni | D3-Pepsi | Potato Dextrose | 25 | 12 |
| Byssochlamys nieva | ATCC 36614 | Potato Dextrose | 25 | 13.7 |
| Byssochlamys fulva | ATCC 24088 | Potato Dextrose | 25 | 11 |
| Byssochlamys fulva | ATCC 24088 | Malt Extract | 30 | 11 |
| Neosartorya fischeri | ATCC 96468 | Potato Dextrose | 25 | 13.7 |
| Talaromyces flavus | ATCC 96463 | Potato Dextrose | 25 | 66.7 |
| Talaromyces flavus var. flavus | ATCC 10512 | Potato Dextrose | 25 | 23.6 |

As apparent from Table 4, SHMP and EDTA combine to lower the observed MIC value of Pimaricin for at least one of the bio-indicator strains. Equally important, the presence of these substances do not interfere with the activity of Pimaricin bound to β-cyclodextrin. SHMP and EDTA not only serve as adjunct preservatives, but also function to stabilize vitamins or natural colors from oxidative degradation. The fact that Pimaricin, when present with EDTA and SHMP, is effective at a concentration of 66 ppm is important in that allows Pimaricin to be present (as a guest in a cyclodextrin complex) as a component of the beverage concentrate. For instance, a concentrate is frequently diluted by a 1 to 5 throw with batch water. If Pimaricin were present in the concentrate at 400 ppm Pimaricin then the concentration in the batched (final) beverage is 66.7 β-cylcodextrin complex with Pimaricin would have to be added separately after after the batching of concentrate with water. The need to make such an addition at the make-site can be reason for concern.

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 5

The effectiveness of pimaricin-complex over a range of pH was evaluated. Pimaricin possesses a single carboxylic acid group that purportedly exhibits a $pK_a$ in the range of 6.5. Consequently, the carboxylic acid moiety is in the protonated form at pH of and below 5.5. Between pH 5.5 and pH 6.5 the degree of protonation drops from nearly 100% to about 50%. In that the impact of pH on solubility is not in play in this instance (because of the complex with cyclodextrin), any observed differences in activity between pH 3 and pH 6.0 are likely the consequence of factors other than the state of protonation of Pimaricin. For instance, a change in the membrane lipid composition of spoilage organisms as a function of pH may cause them to be either more or less tolerant to Pimaricin. Depending on the nature of the beverage formulation, it is also possible that either Pimaricin or the complex would favorably or unfavorably interact with ingredients such as pectin or artificial sweeteners.

Below is the formula for a pH 5.5 tea beverage into which pimaricin can be added as a stand alone preservative or in combination with adjunct preservatives such as Cinnamic acid. Note that the sweetener is Sucrose in this particular example. Pectin is present as a candidate substance which might interact with the complex of Pimaricin and β-cyclodextrin. Similar to the protocol in other examples, two batches of product were prepared with one containing Pimaricin in complex with b-cyclodextrin and the second batch free of pimaricin. The mixing of the two preparations in different ratios permitted the testing of 36 different concentrations of pimaricin in the range 0-400 ppm Pimaricin.

| Ingredient | % Composition |
| --- | --- |
| Added Water | Approximately 93 |
| Natural Sucrose | 6.3 |
| Honey Granules | 0.05 |
| Green Tea solid | 0.1332 |
| Citrus Flavor | 0.002 |
| Green Tea Flavor | 0.2046 |
| Low Haze Pectin | 0.017 |
| Citric acid | 0.055 |
| Acerola Dry Vit C | 0.055 |
| CaCl2—2H2O | 0.0039 |
| MgCl2—6H2O | 0.0027 |
| Succinic Acid | .135 |
| Na+ Succinate | 0.028 |
| β-CD-Pimarcin complex | as Pimaricin = 0-0.04 |

Table 5 below incorporates the test results that establish the 16 week Minimum Inhibitory Concentration (MIC) of Pimaricin for bio-indicator strains of mold in the tea beverage formula of Example 5. The impact of pH 5.5 on the activity of Pimaricin in complex with β-cyclodextrin is minimal, and maybe slightly favorable, relative to test results with beverages of lower pH. Further, the results do not indicate any unfavorable interaction with tea beverage ingredients including pectin and tea solids. A pattern appears to be in play wherein some species are measurably tolerant to Pimaricin relative to the group of bio-indicators as a whole. As suggested previously, some types of mold may be able to negate the effects of Pimaricin through one or more biochemical mechanisms that are not shared broadly among all genus of species of mold.

The absence of interactions between β-cyclodextrin in complex with Pimaricin and other ingredients may seem a less than relevant factor. However, it need be understood that the absence of interaction between traditional preservatives and beverage ingredients is a measurably important issue. It is largely because of chemical interactions between benzoic acid, ascorbic acid and EDTA that the discovery of new preservatives is imperative. Sorbic acid is also prone to degradation in the presence of ascorbic acid. Further, many of the newly identified preservatives such as ε-poly lysine and lauric arginate are themselves reactive with various formulation ingredients.

TABLE 5

| Organism | Strain Designation | Medium to develop spore crop | Incubation Temperature (C.) during sporulaiton | 16 week incubation MIC (ppm) |
|---|---|---|---|---|
| Paecilomyces puntoni | D3-Pepsi | Potato Dextrose | 25 | 18 |
| Paecilomyces variotii | D16-Pepsi | Potato Dextrose | 25 | 12 |
| Byssochlamys fulva | ATCC 24088 | Potato Dextrose | 25 | 12 |
| Byssochlamys fulva | ATCC 24088 | Malt Extract | 30 | 25 |
| Neosartorya fischeri | ATCC 96468 | Potato Dextrose | 25 | 52 |
| Talaromyces flavus | ATCC 96463 | Potato Dextrose | 25 | 255 |
| Talaromyces flavus var. flavus | ATCC 10512 | Potato Dextrose | 25 | 74 |

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 6

As mentioned previously, Pimaricin in complex with cyclodextrin may interact positively with adjunct preservative agents and chemicals. Example 3 indicates the existence of an additive interaction between EDTA and β-cyclodextrin-included Pimaricin in a apple juice beverage of pH 3.4. Example 4 develops the interaction that exists between Pimaricin, EDTA and SHMP at pH 3.4. Here, in Example 6, the range of pH wherein such interactions are found to be possible is extended to a pH of 5.5. Specifically, the interaction between Pimarcin in complex with β-cyclodextrin and Ethylene Diamine Succcinic Acid (EDDS) at pH 5.5. EDDS, like EDTA, is a sequestrant. However, EDDS is purported to occur naturally in a range of microorganisms and plankton. As such, EDDS can be obtained as a natural substance and can be combined with Pimaricin and cyclodextrin to provide an all-natural preservation system.

Below is the formula for a pH 5.5 tea beverage containing 30 ppm EDDS. The addition of Pimaricin in complex with β-cyclodextrin allows for the possibility of an interaction between EDDS and Pimaricin. The sweetener is Sucrose in this particular example. Pectin is present as a candidate substance which might interact with the complex of Pimaricin-β-cyclodextrin or EDDS.

| Ingredient | % Composition |
|---|---|
| Added Water | Approximately 93 |
| Natural Sucrose | 6.3 (when present) |

-continued

| Ingredient | % Composition |
|---|---|
| Honey Granules | 0.05 |
| Green Tea solid | 0.1332 |
| Citrus Flavor | 0.002 |
| Green Tea Flavor | 0.2046 |
| Low Haze Pectin | 0.017 |
| Citric acid | 0.055 |
| Acerola Dry Vit C | 0.055 |
| CaCl2—2H2O | 0.0039 |
| MgCl2—6H2O | 0.0027 |
| Succinic Acid | .135 |
| Na+ Succinate | 0.028 |
| Ethylene Diamine Succinate | 0.003 |

Similar to the protocol in other examples, two batches of product were prepared with one containing Pimaricin in complex with b-cyclodextrin and the second batch free of pimaricin. Both preparations contain 30 ppm EDDS. The mixing of the two preparations in different ratios permitted the testing of 36 different concentrations of pimaricin in the range 0-400 ppm Pimaricin wherein the concentration of EDDS is held steady at 30 ppm.

Table 6 incorporates the test results that establish the 16 week Minimum Inhibitory Concentration (MIC) of Pimaricin for bio-indicator strains of mold in the tea beverage formula of Example 6 wherein the interaction between EDDS and Pimaricin is of interest. The activity of EDDS, like EDTA, is mildly sensitive to pH and either of these substances should bind cations more effectively with increase in pH from 2.0 to 7.0. Reduced availability of cations to spoilage organisms may weaken their tolerance to preservatives such as Pimaricin. For instance, reduced availability of Ca++ likely reduces the integrity of the cell envelop. Ca++ is thought cross link negatively charged head groups of various phospholipids in the membrane. In so doing, Ca++ cross-links phospholipids effectively limiting access into the membrane. With the cell envelope integrity diminished by the action of EDDS on Ca++ availability to the spoilage organism, Pimaricin may more readily gain access to its target sight in the cell membrane. Other interactions between metal cation and certain types of sequestrants might also be in play.

TABLE 6

| Organism | Strain Designation | Medium to develop spore crop | Incubation Temperature (C.) during sporulaiton | 16 week incubation MIC (ppm) |
|---|---|---|---|---|
| Paecilomyces puntoni | D3-Pepsi | Potato Dextrose | 25 | 12 |
| Paecilomyces variotii | D16-Pepsi | Potato Dextrose | 25 | 12 |
| Byssochlamys fulva | ATCC 24088 | Potato Dextrose | 25 | 12 |
| Byssochlamys fulva | ATCC 24088 | Malt Extract | 30 | 25 |
| Neosartorya fischeri | ATCC 96468 | Potato Dextrose | 25 | 34 |

TABLE 6-continued

| Organism | Strain Designation | Medium to develop spore crop | Incubation Temperature (C.) during sporulaiton | 16 week incubation MIC (ppm) |
|---|---|---|---|---|
| Talaromyces flavus | ATCC 96463 | Potato Dextrose | 25 | 155 |
| Talaromyces flavus var. flavus | ATCC 10512 | Potato Dextrose | 25 | 45 |

Here, as in example 5, the impact of pH 5.5 on the activity of Pimaricin in complex with β-cyclodextrin is minimal, and maybe slightly favorable, relative to test results with beverages of lower pH. Further, the results do not indicate any unfavorable interaction with tea beverage ingredients including pectin and tea solids. Finally, the concentration of Pimaricin, in the presence of EDDS, required to inhibit growth of spoilage fungi is measurably less than when EDDS is absent. Either EDDS or EDTA alone is able to at least slow the development of fungi in and of themselves, so the interaction between EDDS and Pimaricin is likely at least additive.

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 7

Examples 2-6 clearly demonstrate that Pimaricin in complex with cyclodextrin may interact positively with adjunct preservative agents and chemicals in the presence of standard or natural sweeteners such as sucrose, fructose and glucose. This example explores whether interactions occur between Pimaricin, when in complex with β cyclodextrin, and synthetic low calorie sweeteners asparatame and Acesulfame-K+. To this end, a tea beverage was prepared as shown below. The beverage was made to have a pH of 5.5. Two aliquots of the tea beverage were prepared, one with and one without 400 ppm Pimaricin in complex with β-cyclodextrin. Individual test samples with varying concentration of Pimaricin were prepared by mixing different proportions of beverage with and without the complexed Pimaricin. In this way, 36 different concentrations of Pimaricin were evaluated between the range of 0 and 400 ppm.

| Ingredient | % Composition |
|---|---|
| Added Water | Approximately 97 |
| Aspartame | 0.105 |

-continued

| Ingredient | % Composition |
|---|---|
| Honey Granules | 0.05 |
| K+ Aspartame | 0.0599 |
| Green Tea solid | 0.1332 |
| Citrus Flavor | 0.002 |
| Green Tea Flavor | 0.2046 |
| Low Haze Pectin | 0.017 |
| Citric acid | 0.055 |
| Acerola Dry Vit C | 0.055 |
| CaCl2—2H2O | 0.0039 |
| MgCl2—6H2O | 0.0027 |
| Succinic Acid | .135 |
| Na+ Succinate | 0.028 |

The data from the test is captured in Table 7. True to form, a fraction of bio-indicator mold demonstrated a degree of sensitivity to Pimaricin that is akin to that observed for yeast. A fraction of the bio-indicator molds were sensitive to Pimaricin only at concentrations that exceed the limit of solubility of Pimaricin when not present as a complex. As previously alluded, the differences in tolerance to Pimaricin are not wholly unexpected. It appears that the lower nutrient content of a beverage fortified with low calorie sweetener does not impart a unfavorable environment with regard to the efficacy of Pimaricin.

TABLE 7

| Organism | Strain Designation | Medium to develop spore crop | Incubation Temperature (C.) during sporulaiton | 16 week incubation MIC (ppm) |
|---|---|---|---|---|
| Paecilomyces puntoni | D3-Pepsi | Potato Dextrose | 25 | 12 |
| Paecilomyces variotii | D16-Pepsi | Potato Dextrose | 25 | 12 |
| Byssochlamys fulva | ATCC 24088 | Potato Dextrose | 25 | 12 |
| Byssochlamys fulva | ATCC 24088 | Malt Extract | 30 | 12 |
| Neosartorya fischeri | ATCC 96468 | Potato Dextrose | 25 | 34 |
| Talaromyces flavus | ATCC 96463 | Potato Dextrose | 25 | 139 |
| Talaromyces flavus var. flavus | ATCC 10512 | Potato Dextrose | 25 | 45 |

The mold spores employed were obtained from the following organisms. *Paecilomyces puntonii* isolate of (D3) Pepsi; ATCC 36614 *Byssochlamys nieva*; ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 8

A "good for you" (nutraceutical) beverage was formulated to a pH of 3.6. Importantly the beverage contains Xanthan Gum. Sucrose is the sweetener in this instance. (Example 9 substitutes Rebaudioside A for Sucrose.) This formulation presents another opportunity to establish that the complex of cyclodextrin and Pimaricin does not interact in a negative manner with ingredients of a beverage such as gums and colloids. To the beverage is added Pimaricin in the form of a complex with gamma (γ)-cyclodextrin. γ-cyclodextrin is larger than is β-cyclodextrin (MW of 1295 versus 1134) and possesses a slightly larger cavity (max opening across is 0.88 nm versus 0.7 nm). In either case, the cavity is not large enough to encompass the whole of a molecule of Pimaricin. It is most probable that the non-polar portion of Pimaricin projects downward into the cavity whereas the polar area tend (carboxyl+amino group) projects above the rim of the cavity. Interestingly, the non-polar end of the molecule calculates a width of approximately 0.63 nm (van der Waal radii+bond length calc). If accurate, Pimaricin should readily fit into the cavity (γ)-cyclodextrin while the fit with is β-cyclodextrin will be quite tight. (At 0.56 nm maximum open width, alpha cyclodextrin is not likely to accommodate pimaricin in a 1:1 guest host relationship).

As done in all examples, two aliquots of beverage were produced, one containing (γ)-cyclodextrin-Pimaricin complex such that a final concentration of 400 ppm Pimaricin was achieved. The blending of the two aliquots in different proportions allowed the generation of 36 different concentrations of Pimaricin ranging from 0-400 ppm. After inoculation with spores from various mold, samples were incubated at 25-27° C. for a period of 16 weeks before. MIC was established (MIC=minimum inhibitory concentration required to prohibit development of mold for a period of 16 weeks).

| Ingredient | % Composition |
| --- | --- |
| Added Water | Approximately 93 |
| Sucrose | 6.8 |
| K+Citrate | 0.025 |
| NutraBlend/Flavor vitamin | 0.025 |
| Calcium Lactate | 0.025 |
| Flavor (grape) | 0.025 |
| Xanthan Gum | 0.030 |
| Ascorbic acid | 0.050 |
| Citric Acid Anyd | 0.067 |
| Color | 0.100 |
| Yumberry Pomegr Flavor | 0.100 |
| Erythritol | 2.490 |
| Pimaricin in complex with ☐cyclodextrin | 0-0.040 |
| CaCl2—2H2O | 0.0039 |
| MgCl2—6H2O | 0.0027 |

The MIC data for this example is captured in Table 8. The pattern persists that certain mold are tolerant to Pimaricin at concentrations above the natural limit of solubility of Pimaricin but that the complexed Pimaricin is able to contain the growth of even the more aggressively tolerant forms of mold. It also appears that the required concentration of Pimaricin may be beverage specific.

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

EXAMPLE 9

A "good for you" (nutraceutical) beverage was formulated to a pH of 3.6. Importantly the beverage contains Xanthan Gum and the natural low calorie sweetener known as Rebaudioside A. This formulation presents another opportunity to establish that the complex of cyclodextrin and Pimaricin does not interact in a negative manner with ingredients of a beverage. To the beverage is added Pimaricin in the form of a complex with gamma (γ)-cyclodextrin. γ-cyclodextrin is larger than is β-cyclodextrin (MW of 1295 versus 1134) and possesses a slightly larger cavity (max opening across is 0.88 nm versus 0.7 nm). In either case, the cavity is not large enough to encompass the whole of a molecule of Pimaricin. It is most probable that the non-polar portion of Pimaricin projects downward into the cavity whereas the polar area end (carboxyl+amino group) projects above the rim of the cavity. Interestingly, the non-polar end of the molecule calculates a width of approximately 0.63 nm (van der Waal radii+bond length calc). If accurate, Pimaricin should readily fit into the cavity (γ)-cyclodextrin while the fit with is β-cyclodextrin will be quite tight. (at 0.56 nm maximum open width, alpha cyclodextrin is not likely to accommodate pimaricin in a 1:1 guest host relationship).

As done in all examples, two aliquots of beverage were produced, one containing (γ)-cyclodextrin-Pimaricin complex such that a final concentration of 400 ppm Pimaricin was achieved. The blending of the two aliquots in different proportions allowed the generation of 36 different concentrations of Pimaricin ranging from 0-400 ppm. After inoculation with spores from various mold, samples were incubated at 25-27° C. for a period of 16 weeks before MIC was established (MIC=minimum inhibitory concentration required to prohibit development of mold for a period of 16 weeks).

| Ingredient | % Composition |
| --- | --- |
| Added Water | Approximately 97 |
| Rebaudioside A | 0.021 |
| K+Citrate | 0.025 |
| NutraBlend/Flavor vitamin | 0.025 |
| Calcium Lactate | 0.025 |
| Flavor (grape) | 0.025 |
| Xantham Gum | 0.030 |
| Ascorbic acid | 0.050 |
| Citric Acid Anyd | 0.067 |

TABLE 8

| Organism | Strain Designation | Medium to develop spore crop | Incubation Temperature (C.) during sporulaiton | 16 week incubation MIC (ppm) |
| --- | --- | --- | --- | --- |
| *Paecilomyces puntoni* | D3-Pepsi | Potato Dextrose | 25 | 12 |
| *Paecilomyces variotii* | D16-Pepsi | Potato Dextrose | 25 | 60 |
| *Byssochlamys fulva* | ATCC 24088 | Potato Dextrose | 25 | 12 |
| *Byssochlamys fulva* | ATCC 24088 | Malt Extract | 30 | 12 |
| *Neosartorya fischeri* | ATCC 96468 | Potato Dextrose | 25 | 34 |
| *Talaromyces flavus* | ATCC 96463 | Potato Dextrose | 25 | 278 |
| *Talaromyces flavus* var *flavus* | ATCC 10512 | Potato Dextrose | 25 | 45 |

-continued

| Ingredient | % Composition |
|---|---|
| Color | 0.100 |
| Yumberry Pomegr Flavor | 0.100 |
| Erythitrol | 2.490 |
| Pimaricin in complex with γ cyclodextrin | 0-0.040 |
| CaCl2—2H2O | 0.0039 |
| MgCl2—6H2O | 0.0027 |

The documented MIC values are captured in Table 9. Similar to other tests, there is no evidence that Pimaricin interacted in a negative manner with ingredients of the beverage. It must be borne in mind that the activity of some antimicrobial substances can be compromised by interaction with beverage components. In some instances, complexes form between antimicrobial substances and beverage components resulting in haze or precipitation. In other instances, chemical reactions between beverage ingredients and the antimicrobial can occur. For instance, sorbic acid is considerably less stable in the presence of ascorbic acid.

There is also no indication that release of Pimaricin from γ-cyclodextrin is measurably hindered relative to β-cyclodextrin bound Pimaricin. In both instances, It appears that Pimaricin is readily lost from the complex into the membrane of spoilage organisms when the opportunity presents itself and regardless of whether Pimaricin is in complex with β-cyclodextrin or γ-cyclodextrin. In fact, release of Pimaricin from γ-cyclodextrin may be slightly more readily accomplished given the slightly lower MIC exhibited with γ-cyclodextrin versus β-cyclodextrin for *Talaromcyces flavus*.

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

between Pimaricin and other similarly structured preservative compounds (parabens, weak acids (sorbic, benzoic)).

As outlined previously, two separate aliquots of beverage were formulated, one containing Pimaricin in complex with g-cyclodextrin and one without. Both aliquots contained 30 ppm Cinnamic acid. When the two aliquots were mixed in different proportions, different concentrations of Pimaricin were obtained but the concentration of Cinnamic acid is 30 ppm in all samples prepared.

| Ingredient | % Composition |
|---|---|
| Added Water | Approximately 97 |
| Rebaudioside A | 0.021 |
| K+Citrate | 0.025 |
| NutraBlend/Flavor vitamin | 0.025 |
| Calcium Lactate | 0.025 |
| Flavor (grape) | 0.025 |
| Xantham Gum | 0.030 |
| Ascorbic acid | 0.050 |
| Citric Acid Anyd | 0.067 |
| Color | 0.100 |
| Yumberry Pomegr Flavor | 0.100 |
| Erythitrol | 2.490 |
| Cinnamic acid (as the acid) | 0.003 |
| Pimaricin in complex with ☐cyclodextrin | 0-0.040 |
| CaCl2—2H2O | 0.0039 |
| MgCl2—6H2O | 0.0027 |

The mold spores employed were obtained from the following organisms. *Paecilomyces puntonii* isolate of (D3) Pepsi; ATCC 36614 *Byssochlamys nieva*, ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus* ATCC strain 90900. Each spore type was present, initially, at approximately 20 spores per milliliter.

As evidenced by the results depicted in Table 10, a measurable decrease in the MIC values were found for some, but not all, mold bio-indicators when Cinnamic acid and Pima-

TABLE 9

| Organism | Strain Designation | Medium to develop spore crop | Incubation Temperature (C.) during sporulaiton | 16 week incubation MIC (ppm) |
|---|---|---|---|---|
| *Paecilomyces puntoni* | D3-Pepsi | Potato Dextrose | 25 | 12 |
| *Paecilomyces variotii* | D16-Pepsi | Potato Dextrose | 25 | 54 |
| *Byssochlamys fulva* | ATCC 24088 | Potato Dextrose | 25 | 12 |
| *Byssochlamys fulva* | ATCC 24088 | Malt Extract | 30 | 12 |
| *Neosartorya fischeri* | ATCC 96468 | Potato Dextrose | 25 | 54 |
| *Talaromyces flavus* | ATCC 96463 | Potato Dextrose | 25 | 200 |
| *Talaromyces flavus* var *flavus* | ATCC 10512 | Potato Dextrose | 25 | 67 |

EXAMPLE 10

It was of interest to establish whether Pimaricin might interact additively or synergistically with antimicrobial substances other than sequestrants. To this end, a nutraceutical beverage was formulated to contain the natural preservative substance, Cinnamic acid (30 ppm). Cinnamic acid possesses antimicrobial activity but the impact of Cinnamic acid on the sensory attributes of beverages is unfavorable when Cinnamic acid is present at a concentration much above 30 ppm (sensory threshold). At 30 ppm, Cinnamic acid is not a satisfactory preservative in and of itself. In fact, some spoilage organisms can employ Cinnamic acid as a nutrient when present at concentrations below 200-300 ppm. Demonstration of an additive or synergistic effect between Cinnamic acid and Pimaricin would serve to predict similar interactions ricin act in concert. This result could not have been predicted to any degree because the mechanism of action by which Cinnamic acid functions as an antimicrobial is not well understood. Consequently, it was even in the range of possibilities that Cinnamic acid might function antagonistically relative to Pimaricin. It is also important to recognize that the MIC values (16 week) of Pimaricin in the presence of Cinnamic acid needed to preserve product against spoilage from an array of spoilage mold is still above the solubility limit of Pimaricin in the absence of cyclodextrin (approximately 52 ppm in water at ambient and lower still in high acid beverages). The lowered requirement of Pimaricin when acting in concert with other antimicrobial substances allows for the possible use of α-cyclodextrin bound Pimaricin. Importantly, there is no appearance of a negative impact on the activity of P

TABLE 10

| Organism | Strain Designation | Medium to develop spore crop | Incubation Temperature (C.) during sporulaiton | 16 week incubation MIC (ppm) |
|---|---|---|---|---|
| *Paecilomyces puntoni* | D3-Pepsi | Potato Dextrose | 25 | 12 |
| *Paecilomyces variotii* | D16-Pepsi | Potato Dextrose | 25 | 32 |
| *Byssochlamys fulva* | ATCC 24088 | Potato Dextrose | 25 | 12 |
| *Byssochlamys fulva* | ATCC 24088 | Malt Extract | 30 | 12 |
| *Neosartorya fischeri* | ATCC 96468 | Potato Dextrose | 25 | 34 |
| *Talaromyces flavus* | ATCC 96463 | Potato Dextrose | 25 | 126 |
| *Talaromyces flavus* var *flavus* | ATCC 10512 | Potato Dextrose | 25 | 34 |

Various changes and modifications may be made without departing from the spirit and scope of the invention, as defined in the appended claims.

What is claimed is:

1. A beverage comprising:
a beverage component;
a cyclodextrin-pimaricin complex;
a pH of 2.5 to 4.6;
wherein the beverage when placed within a sealed container is substantially not spoiled by microorganisms for a period of at least 16 weeks.

2. The beverage of claim 1, wherein the cyclodextrin is selected from the group consisting of β-cyclodextrin, α-cyclodextrin, γ-cyclodextrin, sulfobutyl ether β-cyclodextrin, hydroxypropyl β-cyclodextrin, randomly methylated β-cyclodextrin, and maltosyl/dimaltosyl β-cyclodextrin.

3. The beverage of claim 1, wherein the cyclodextrin is selected from the group consisting of β-cyclodextrin or γ-cyclodextrin.

4. The beverage of claim 1 wherein the pimaricin is present in an amount of at least about 25 mg/L and to about 400 mg/L.

5. The beverage of claim 1 wherein the pimaricin is present in an amount of at least about 25 mg/L and to about 250 mg/L.

6. The beverage of claim 4 wherein the Pimaricin is present in the beverage in an amount of at least about 50 mg/L and to about 200 mg/L.

7. The beverage of claim 5 wherein the Pimaricin is present in the beverage in an amount of at least about 75 mg/L and to about 150 mg/L.

8. The beverage preservative system of claim 1 further comprising dimethyl dicarbonate.

9. The beverage of claim 8 wherein the dimethyl dicarbonate is present at an initial concentration in the range of about 75 mg/L to about 250 mg/L.

10. The beverage of claim 1 further comprising a sweetener selected from rebaudioside A, acesulfame K, or aspartame.

11. The beverage of claim 1 further comprising a sequestrant.

12. The beverage of claim 11 wherein the sequestrant is EDTA or EDDS or mixtures thereof.

13. The beverage of claim 1 further comprising at least one of sodium hexametaphosphate, polyphosphate or diphosphonic acid.

14. The beverage of claim 1, wherein the beverage component comprises at least one of added water, a juice, a flavorant, a sweetener, an acidulant, a colorant, a vitamin, a buffering agent, a thickener, an emulsifier, and an anti-foaming agent.

15. The beverage of claim 1, wherein the juice is a fruit juice from at least one of orange, grapefruit, lemon, lime, tangerine, apple, grape, cranberry, raspberry, blueberry, strawberry, pineapple, pear, peach, pomegranate, prune, cherry, mango, papaya, lychee, and guava.

16. The beverage of claim 1, wherein the beverage is a carbonated beverage, a non-carbonated beverage, a soft drink, a fruit juice, a fruit juice flavored drink, a fruit-flavored drink, an energy drink, a hydration drink, a sport drink, a health and wellness drink, a fountain beverage, a frozen ready-to-drink beverage, a frozen carbonated beverage, a liquid concentrate, a coffee beverage, a tea beverage, a dairy beverage, a soy beverage, a vegetable drink, a flavored water, an enhanced water, or an alcoholic beverage.

17. The beverage of claim 1 further comprising cinnamic acid.

18. A beverage comprising:
a beverage component;
a cyclodextrin-pimaricin complex;
dimethyl dicarbonate;
a pH of 2.5 to 4.6;
wherein the beverage when placed within a sealed container is substantially not spoiled by microorganisms for a period of at least 16 weeks.

19. The beverage of claim 18 wherein the dimethyl dicarbonate is present at an initial concentration in the range of about 75 mg/L to about 250 mg/L.

* * * * *